(12) United States Patent
Yegani et al.

(10) Patent No.: US 8,472,415 B2
(45) Date of Patent: Jun. 25, 2013

(54) PERFORMANCE OPTIMIZATION WITH INTEGRATED MOBILITY AND MPLS

(75) Inventors: Parviz Yegani, Danville, CA (US); Anand K. Oswal, Sunnyvale, CA (US); Timothy P. Stammers, Raleigh, NC (US); Jayaraman Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 661 days.

(21) Appl. No.: 11/714,566

(22) Filed: Mar. 6, 2007

(65) Prior Publication Data
US 2007/0206556 A1 Sep. 6, 2007

Related U.S. Application Data

(60) Provisional application No. 60/780,176, filed on Mar. 6, 2006.

(51) Int. Cl.
*H04W 4/00* (2009.01)

(52) U.S. Cl.
USPC ............................ 370/338; 370/328; 370/352

(58) Field of Classification Search
USPC ................................................. 370/329, 389
See application file for complete search history.

(56) References Cited

U.S. PATENT DOCUMENTS

| | | | |
|---|---|---|---|
| 2,911,462 A | 11/1959 | Brady | |
| 3,793,489 A | 2/1974 | Sank | |
| 3,909,121 A | 9/1975 | De Mesquita Cardoso | |
| 4,270,103 A | 5/1981 | Schroder | |
| D270,271 S | 8/1983 | Steele | |
| 4,400,724 A | 8/1983 | Fields | |
| 4,473,285 A | 9/1984 | Winter | |
| 4,494,144 A | 1/1985 | Brown | |
| 4,750,123 A | 6/1988 | Christian | |

(Continued)

FOREIGN PATENT DOCUMENTS

| | | |
|---|---|---|
| CN | 1402451 A | 3/2003 |
| CN | 1507173 A | 6/2004 |

(Continued)

OTHER PUBLICATIONS

S. Boros, "Policy-Based Network Mnagement With SNMP", 2000, p. 3.*

(Continued)

*Primary Examiner* — Erika A Washington
(74) *Attorney, Agent, or Firm* — Patent Capital Group

(57) ABSTRACT

In one embodiment, a first node receives data associated with a mobile node. The mobile node includes a plurality of sessions associated with it. For example, the plurality of sessions may be associated with flows for different services, such as voice over IP. A session for the data is determined out of a plurality of sessions. Labels may be provided that correspond to sessions in the plurality of sessions and a label is then determined for the session. The data is sent to the second node in a packet that includes the label. The packet is sent using a label switched path (LSP) in a multi-protocol label switching (MPLS) network. When the second node receives the data, it uses the label to determine a performance treatment to apply to the data. For example, different labels may correspond to the different sessions and different sessions may be associated with different quality of service (QoS) levels.

13 Claims, 4 Drawing Sheets

U.S. PATENT DOCUMENTS

| | | | |
|---|---|---|---|
| 4,815,132 A | 3/1989 | Minami |
| 4,827,253 A | 5/1989 | Maltz |
| 4,853,764 A | 8/1989 | Sutter |
| 4,890,314 A | 12/1989 | Judd et al. |
| 4,961,211 A | 10/1990 | Tsugane et al. |
| 4,994,912 A | 2/1991 | Lumelsky et al. |
| 5,003,532 A | 3/1991 | Ashida et al. |
| 5,020,098 A | 5/1991 | Celli |
| 5,033,969 A | 7/1991 | Kamimura |
| 5,136,652 A | 8/1992 | Jibbe et al. |
| 5,187,571 A | 2/1993 | Braun et al. |
| 5,200,818 A | 4/1993 | Neta et al. |
| 5,243,697 A | 9/1993 | Hoeber et al. |
| 5,249,035 A | 9/1993 | Yamanaka |
| 5,255,211 A | 10/1993 | Redmond |
| D341,848 S | 11/1993 | Bigelow et al. |
| 5,268,734 A | 12/1993 | Parker et al. |
| 5,317,405 A | 5/1994 | Kuriki et al. |
| 5,337,363 A | 8/1994 | Platt |
| 5,347,363 A | 9/1994 | Yamanaka |
| 5,351,067 A | 9/1994 | Lumelsky et al. |
| 5,359,362 A | 10/1994 | Lewis et al. |
| D357,468 S | 4/1995 | Rodd |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,495,576 A | 2/1996 | Ritchey |
| 5,502,481 A | 3/1996 | Dentinger et al. |
| 5,502,726 A | 3/1996 | Fischer |
| 5,506,604 A | 4/1996 | Nally et al. |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,587,726 A | 12/1996 | Moffat |
| 5,612,733 A | 3/1997 | Flohr |
| 5,621,894 A | 4/1997 | Menezes et al. |
| 5,625,410 A | 4/1997 | Washino et al. |
| 5,666,153 A | 9/1997 | Copeland |
| 5,673,401 A | 9/1997 | Volk et al. |
| 5,675,374 A | 10/1997 | Kohda |
| 5,689,663 A | 11/1997 | Williams |
| 5,708,787 A | 1/1998 | Nakano et al. |
| 5,713,033 A | 1/1998 | Sado |
| 5,715,377 A | 2/1998 | Fukushima et al. |
| D391,558 S | 3/1998 | Marshall et al. |
| D391,935 S | 3/1998 | Sakaguchi et al. |
| D392,269 S | 3/1998 | Mason et al. |
| 5,729,471 A | 3/1998 | Jain et al. |
| 5,737,011 A | 4/1998 | Lukacs |
| 5,745,116 A | 4/1998 | Pisutha-Arnond |
| 5,748,121 A | 5/1998 | Romriell |
| D395,292 S | 6/1998 | Vu |
| 5,760,826 A | 6/1998 | Nayar |
| D396,455 S | 7/1998 | Bier |
| D396,456 S | 7/1998 | Bier |
| 5,790,182 A | 8/1998 | St. Hilaire |
| 5,796,724 A | 8/1998 | Rajamani et al. |
| D397,687 S | 9/1998 | Arora et al. |
| D398,595 S | 9/1998 | Baer et al. |
| 5,815,196 A | 9/1998 | Alshawi |
| D399,501 S | 10/1998 | Arora et al. |
| 5,818,514 A | 10/1998 | Duttweiler et al. |
| 5,821,985 A | 10/1998 | Iizawa |
| 5,825,362 A | 10/1998 | Retter |
| D406,124 S | 2/1999 | Newton et al. |
| 5,889,499 A | 3/1999 | Nally et al. |
| 5,894,321 A | 4/1999 | Downs et al. |
| D409,243 S | 5/1999 | Lonergan |
| 5,901,352 A | 5/1999 | St-Pierre et al. |
| D410,447 S | 6/1999 | Chang |
| 5,929,857 A | 7/1999 | Dinallo et al. |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 5,996,003 A | 11/1999 | Namikata et al. |
| D419,543 S | 1/2000 | Warren et al. |
| D420,995 S | 2/2000 | Imamura et al. |
| 6,069,648 A | 5/2000 | Suso et al. |
| 6,069,658 A | 5/2000 | Watanabe |
| 6,088,045 A | 7/2000 | Lumelsky et al. |
| 6,097,390 A | 8/2000 | Marks |
| 6,122,127 A | 9/2000 | Flinsbaugh |
| 6,124,896 A | 9/2000 | Kurashige |
| 6,137,485 A | 10/2000 | Kawai et al. |
| 6,148,092 A | 11/2000 | Qian |
| D435,561 S | 12/2000 | Pettigrew et al. |
| 6,167,162 A | 12/2000 | Jacquin et al. |
| 6,172,703 B1 | 1/2001 | Lee |
| 6,173,069 B1 | 1/2001 | Daly et al. |
| D438,873 S | 3/2001 | Wang et al. |
| D440,575 S | 4/2001 | Wang et al. |
| 6,211,870 B1 | 4/2001 | Foster |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,259,469 B1 | 7/2001 | Ejima et al. |
| 6,266,082 B1 | 7/2001 | Yonezawa et al. |
| 6,266,098 B1 | 7/2001 | Cove et al. |
| D446,790 S | 8/2001 | Wang et al. |
| 6,285,392 B1 | 9/2001 | Satoda et al. |
| 6,292,188 B1 | 9/2001 | Carlson et al. |
| 6,292,575 B1 | 9/2001 | Bortolussi et al. |
| D450,323 S | 11/2001 | Moore et al. |
| 6,332,153 B1 | 12/2001 | Cohen |
| D453,167 S | 1/2002 | Hasegawa et al. |
| 6,341,046 B1 | 1/2002 | Peterson |
| D454,574 S | 3/2002 | Wasko et al. |
| 6,356,589 B1 | 3/2002 | Gebler et al. |
| 6,380,539 B1 | 4/2002 | Edgar |
| 6,396,514 B1 | 5/2002 | Kohno |
| 6,420,910 B1 | 7/2002 | Contreras |
| 6,424,377 B1 | 7/2002 | Driscoll, Jr. |
| D461,191 S | 8/2002 | Hickey et al. |
| 6,430,222 B1 | 8/2002 | Okadia |
| 6,434,159 B1 | 8/2002 | Woodward et al. |
| 6,459,451 B2 | 10/2002 | Driscoll et al. |
| 6,462,767 B1 | 10/2002 | Obata et al. |
| 6,493,032 B1 | 12/2002 | Wallerstein et al. |
| D468,322 S | 1/2003 | Walker et al. |
| 6,507,356 B1 | 1/2003 | Jackel et al. |
| D470,153 S | 2/2003 | Billmaier et al. |
| 6,515,695 B1 | 2/2003 | Sato et al. |
| D474,194 S | 5/2003 | Kates et al. |
| 6,573,904 B1 | 6/2003 | Chun et al. |
| 6,577,333 B2 | 6/2003 | Tai et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,955 B1 | 7/2003 | Falcon |
| 6,593,956 B1 | 7/2003 | Potts et al. |
| D478,090 S | 8/2003 | Nguyen et al. |
| D478,912 S | 8/2003 | Johnson |
| 6,611,281 B2 | 8/2003 | Strubbe |
| D482,368 S | 11/2003 | den Toonder et al. |
| 6,693,663 B1 | 2/2004 | Harris |
| 6,694,094 B2 | 2/2004 | Partynski et al. |
| 6,704,048 B1 | 3/2004 | Malkin et al. |
| 6,710,797 B1 | 3/2004 | McNelley et al. |
| D492,692 S | 7/2004 | Fallon et al. |
| 6,763,226 B1 | 7/2004 | McZeal |
| 6,768,722 B1 | 7/2004 | Katseff et al. |
| D494,186 S | 8/2004 | Johnson |
| 6,771,303 B2 | 8/2004 | Zhang et al. |
| 6,774,927 B1 | 8/2004 | Cohen et al. |
| D495,715 S | 9/2004 | Gildred |
| 6,791,957 B2 | 9/2004 | Kim |
| 6,795,108 B2 | 9/2004 | Jarboe et al. |
| 6,795,558 B2 | 9/2004 | Matsuo et al. |
| 6,798,834 B1 | 9/2004 | Murakami et al. |
| 6,806,898 B1 | 10/2004 | Toyama et al. |
| 6,807,280 B1 | 10/2004 | Stroud et al. |

| | | | | | | |
|---|---|---|---|---|---|---|
| 6,809,724 B1 | 10/2004 | Shiraishi et al. | | D564,530 S | 3/2008 | Kim et al. |
| 6,831,653 B2 | 12/2004 | Kehlet et al. | | D567,202 S | 4/2008 | Rieu Piquet |
| 6,844,990 B2 | 1/2005 | Artonne et al. | | 7,352,809 B2 | 4/2008 | Wenger et al. |
| 6,853,398 B2 | 2/2005 | Malzbender et al. | | 7,353,279 B2 | 4/2008 | Durvasula et al. |
| 6,867,798 B1 | 3/2005 | Wada et al. | | 7,353,462 B2 | 4/2008 | Caffarelli |
| 6,882,358 B1 | 4/2005 | Schuster et al. | | 7,359,731 B2 | 4/2008 | Choksi |
| 6,888,358 B2 | 5/2005 | Lechner et al. | | 7,382,748 B1 | 6/2008 | Bharatia et al. |
| D506,208 S | 6/2005 | Jewitt et al. | | 7,399,095 B2 | 7/2008 | Rondinelli |
| 6,909,438 B1 | 6/2005 | White et al. | | D574,392 S | 8/2008 | Kwag et al. |
| 6,911,995 B2 | 6/2005 | Ivanov et al. | | 7,411,975 B1 | 8/2008 | Mohaban |
| 6,922,718 B2 | 7/2005 | Chang | | 7,413,150 B1 | 8/2008 | Hsu |
| 6,925,613 B2 | 8/2005 | Gibson | | 7,421,732 B2 | 9/2008 | Costa-Requena et al. |
| 6,963,653 B1 | 11/2005 | Miles | | 7,428,000 B2 | 9/2008 | Cutler et al. |
| D512,723 S | 12/2005 | Wirz | | D578,496 S | 10/2008 | Leonard |
| 6,980,526 B2 | 12/2005 | Jang et al. | | 7,440,615 B2 | 10/2008 | Gong et al. |
| 6,981,047 B2 | 12/2005 | Hanson et al. | | D580,451 S | 11/2008 | Steele et al. |
| 6,989,754 B2 | 1/2006 | Kisacanin et al. | | 7,450,134 B2 | 11/2008 | Maynard et al. |
| 6,989,836 B2 | 1/2006 | Ramsey | | 7,471,320 B2 | 12/2008 | Malkin et al. |
| 6,989,856 B2 | 1/2006 | Firestone et al. | | D585,453 S | 1/2009 | Chen et al. |
| 6,990,086 B1 * | 1/2006 | Holur et al. ............... 370/329 | | 7,477,322 B2 | 1/2009 | Hsieh |
| 7,002,973 B2 | 2/2006 | MeLampy et al. | | 7,477,657 B1 * | 1/2009 | Murphy et al. ............... 370/468 |
| 7,028,092 B2 | 4/2006 | MeLampy et al. | | 7,480,870 B2 | 1/2009 | Anzures et al. |
| 7,030,890 B1 | 4/2006 | Jouet et al. | | D588,560 S | 3/2009 | Mellingen et al. |
| 7,031,311 B2 | 4/2006 | MeLampy et al. | | D589,053 S | 3/2009 | Steele et al. |
| D521,521 S | 5/2006 | Jewitt et al. | | 7,505,036 B1 | 3/2009 | Baldwin |
| 7,039,027 B2 | 5/2006 | Bridgelall | | D591,306 S | 4/2009 | Setiawan et al. |
| 7,043,528 B2 | 5/2006 | Schmitt et al. | | 7,518,051 B2 | 4/2009 | Redmann |
| 7,046,862 B2 | 5/2006 | Ishizaka et al. | | D592,621 S | 5/2009 | Han |
| 7,054,268 B1 | 5/2006 | Parantainen et al. | | 7,529,425 B2 | 5/2009 | Kitamura et al. |
| D522,559 S | 6/2006 | Naito et al. | | 7,532,230 B2 | 5/2009 | Culbertson et al. |
| 7,057,636 B1 | 6/2006 | Cohen-Solal et al. | | 7,532,232 B2 | 5/2009 | Shah et al. |
| 7,057,662 B2 | 6/2006 | Malzbender | | 7,534,056 B2 | 5/2009 | Cross et al. |
| 7,058,690 B2 | 6/2006 | Maehiro | | 7,545,761 B1 * | 6/2009 | Kalbag ............... 370/310 |
| D524,321 S | 7/2006 | Hally et al. | | 7,551,432 B2 | 6/2009 | Bockheim et al. |
| 7,072,504 B2 | 7/2006 | Miyano et al. | | 7,555,141 B2 | 6/2009 | Mori |
| 7,080,157 B2 | 7/2006 | McCanne | | D595,728 S | 7/2009 | Scheibe et al. |
| 7,092,002 B2 | 8/2006 | Ferren et al. | | D596,646 S | 7/2009 | Wani |
| 7,111,045 B2 | 9/2006 | Kato et al. | | 7,575,537 B2 | 8/2009 | Ellis |
| 7,126,627 B1 | 10/2006 | Lewis et al. | | D602,033 S | 10/2009 | Vu et al. |
| 7,131,135 B1 | 10/2006 | Virag et al. | | D602,453 S | 10/2009 | Ding et al. |
| 7,136,651 B2 | 11/2006 | Kalavade | | D602,495 S | 10/2009 | Um et al. |
| 7,139,767 B1 | 11/2006 | Taylor et al. | | 7,610,352 B2 | 10/2009 | AlHusseini et al. |
| D533,525 S | 12/2006 | Arie | | 7,610,599 B1 | 10/2009 | Nashida et al. |
| D533,852 S | 12/2006 | Ma | | 7,616,226 B2 | 11/2009 | Roessler et al. |
| 7,151,758 B2 | 12/2006 | Kumaki et al. | | D608,788 S | 1/2010 | Meziere |
| D534,511 S | 1/2007 | Maeda et al. | | 7,646,419 B2 | 1/2010 | Cernasov |
| D535,954 S | 1/2007 | Hwang et al. | | D610,560 S | 2/2010 | Chen |
| D536,001 S | 1/2007 | Armstrong et al. | | 7,657,259 B2 | 2/2010 | Yegani et al. |
| 7,158,674 B2 | 1/2007 | Suh | | 7,661,075 B2 | 2/2010 | Lahdesmaki |
| 7,161,942 B2 | 1/2007 | Chen et al. | | 7,664,750 B2 | 2/2010 | Frees et al. |
| 7,164,435 B2 | 1/2007 | Wang et al. | | D612,394 S | 3/2010 | La et al. |
| D536,340 S | 2/2007 | Jost et al. | | 7,675,704 B2 | 3/2010 | Dean |
| 7,177,624 B2 | 2/2007 | Sivanandan et al. | | 7,676,763 B2 | 3/2010 | Rummel |
| D539,243 S | 3/2007 | Chiu et al. | | 7,679,639 B2 | 3/2010 | Harrell et al. |
| D540,336 S | 4/2007 | Kim et al. | | 7,692,680 B2 | 4/2010 | Graham |
| D541,773 S | 5/2007 | Chong et a | | 7,707,247 B2 | 4/2010 | Dunn et al. |
| D542,247 S | 5/2007 | Kinoshita et al. | | D615,514 S | 5/2010 | Mellingen et al. |
| D544,494 S | 6/2007 | Cummins | | 7,710,448 B2 | 5/2010 | De Beer et al. |
| D545,314 S | 6/2007 | Kim | | 7,710,450 B2 | 5/2010 | Dhuey et al. |
| D547,320 S | 7/2007 | Kim et al. | | 7,715,657 B2 | 5/2010 | Lin et al. |
| 7,239,338 B2 | 7/2007 | Krisbergh et al. | | 7,719,605 B2 | 5/2010 | Hirasawa et al. |
| 7,246,118 B2 | 7/2007 | Chastain et al. | | 7,719,662 B2 | 5/2010 | Bamji et al. |
| D548,742 S | 8/2007 | Fletcher | | 7,720,277 B2 | 5/2010 | Hattori |
| 7,254,785 B2 | 8/2007 | Reed | | D617,806 S | 6/2010 | Christie et al. |
| D550,635 S | 9/2007 | DeMaio et al. | | D619,608 S | 7/2010 | Meziere |
| D551,184 S | 9/2007 | Kanou et al. | | D619,609 S | 7/2010 | Meziere |
| D551,672 S | 9/2007 | Wirz | | D619,610 S | 7/2010 | Meziere |
| 7,266,091 B2 | 9/2007 | Singh et al. | | D619,611 S | 7/2010 | Meziere |
| 7,269,292 B2 | 9/2007 | Steinberg | | 7,751,830 B2 | 7/2010 | Iyer et al. |
| 7,274,555 B2 | 9/2007 | Kim et al. | | 7,752,568 B2 | 7/2010 | Park et al. |
| D554,664 S | 11/2007 | Van Dongen et al. | | D621,410 S | 8/2010 | Verfuerth et al. |
| D555,610 S | 11/2007 | Yang et al. | | D626,102 S | 10/2010 | Buzzard et al. |
| D559,265 S | 1/2008 | Armstrong et al. | | D626,103 S | 10/2010 | Buzzard et al. |
| D560,225 S | 1/2008 | Park et al. | | D628,175 S | 11/2010 | Desai et al. |
| D560,681 S | 1/2008 | Fletcher | | 7,831,996 B2 | 11/2010 | Dholakia et al. |
| D561,130 S | 2/2008 | Won et al. | | 7,839,434 B2 | 11/2010 | Ciudad et al. |
| 7,333,451 B1 | 2/2008 | Khalil et al. | | 7,861,189 B2 | 12/2010 | Watanabe et al. |
| 7,336,299 B2 | 2/2008 | Kostrzewski | | 7,864,693 B2 | 1/2011 | Burman et al. |
| D563,965 S | 3/2008 | Van Dongen et al. | | D631,891 S | 2/2011 | Vance et al. |

| | | | | | | |
|---|---|---|---|---|---|---|
| 7,889,851 B2 | 2/2011 | Shah et al. | | 2004/0178955 A1 | 9/2004 | Menache et al. |
| 7,890,888 B2 | 2/2011 | Glasgow et al. | | 2004/0189463 A1 | 9/2004 | Wathen |
| 7,894,531 B1 | 2/2011 | Cetin et al. | | 2004/0189676 A1 | 9/2004 | Dischert |
| D634,726 S | 3/2011 | Harden et al. | | 2004/0196250 A1 | 10/2004 | Mehrotra et al. |
| D635,569 S | 4/2011 | Park, II | | 2004/0207718 A1 | 10/2004 | Boyden et al. |
| D635,975 S | 4/2011 | Seo et al. | | 2004/0218755 A1 | 11/2004 | Marton et al. |
| D637,199 S | 5/2011 | Brinda | | 2004/0221243 A1 | 11/2004 | Twerdahl et al. |
| D638,025 S | 5/2011 | Saft et al. | | 2004/0225878 A1 | 11/2004 | Costa-Requena et al. |
| D638,850 S | 5/2011 | Woods et al. | | 2004/0246962 A1* | 12/2004 | Kopeikin et al. ............. 370/392 |
| D638,853 S | 5/2011 | Brinda | | 2004/0254982 A1 | 12/2004 | Hoffman et al. |
| 7,939,959 B2 | 5/2011 | Wagoner | | 2004/0260796 A1* | 12/2004 | Sundqvist et al. ............. 709/223 |
| D640,268 S | 6/2011 | Jones et al. | | 2005/0007954 A1* | 1/2005 | Sreemanthula et al. ...... 370/229 |
| D642,184 S | 7/2011 | Brouwers et al. | | 2005/0009516 A1 | 1/2005 | Stumpert et al. |
| 7,990,422 B2 | 8/2011 | Ahiska et al. | | 2005/0022130 A1 | 1/2005 | Fabritius |
| 7,996,775 B2 | 8/2011 | Cole et al. | | 2005/0024484 A1 | 2/2005 | Leonard |
| 8,000,559 B2 | 8/2011 | Kwon | | 2005/0034084 A1 | 2/2005 | Ohtsuki et al. |
| D648,734 S | 11/2011 | Christie et al. | | 2005/0039142 A1 | 2/2005 | Jalon et al. |
| 8,077,857 B1 | 12/2011 | Lambert | | 2005/0050246 A1* | 3/2005 | Lakkakorpi et al. ............. 710/36 |
| D652,050 S | 1/2012 | Chaudhri | | 2005/0078824 A1 | 4/2005 | Malinen et al. |
| D652,429 S | 1/2012 | Steele et al. | | 2005/0081160 A1 | 4/2005 | Wee et al. |
| D654,926 S | 2/2012 | Lipman et al. | | 2005/0088203 A1 | 4/2005 | Price, Jr. |
| 8,132,100 B2 | 3/2012 | Seo et al. | | 2005/0091539 A1 | 4/2005 | Wang et al. |
| 8,135,068 B1 | 3/2012 | Alvarez | | 2005/0099492 A1 | 5/2005 | Orr |
| D656,948 S | 4/2012 | Knudsen et al. | | 2005/0110867 A1 | 5/2005 | Schulz |
| D660,313 S | 5/2012 | Williams et al. | | 2005/0117022 A1 | 6/2005 | Marchant |
| 8,179,419 B2 | 5/2012 | Girish et al. | | 2005/0120213 A1 | 6/2005 | Winget et al. |
| 8,209,632 B2 | 6/2012 | Reid et al. | | 2005/0129325 A1 | 6/2005 | Wu |
| 8,219,920 B2 | 7/2012 | Langoulant et al. | | 2005/0136949 A1 | 6/2005 | Barnes |
| D664,985 S | 8/2012 | Tanghe et al. | | 2005/0147257 A1 | 7/2005 | Melchior et al. |
| D669,086 S | 10/2012 | Boyer et al. | | 2005/0149872 A1 | 7/2005 | Fong et al. |
| D669,088 S | 10/2012 | Boyer et al. | | 2005/0154988 A1 | 7/2005 | Proehl et al. |
| D669,913 S | 10/2012 | Maggiotto et al. | | 2005/0162221 A1 | 7/2005 | Barnett et al. |
| 8,302,020 B2 | 10/2012 | Louch et al. | | 2005/0174669 A1 | 8/2005 | Contreras et al. |
| D670,723 S | 11/2012 | Khan et al. | | 2005/0180041 A1 | 8/2005 | Kajiyama et al. |
| D671,136 S | 11/2012 | Barnett et al. | | 2005/0223069 A1 | 10/2005 | Cooperman et al. |
| D671,141 S | 11/2012 | Peters et al. | | 2005/0235209 A1 | 10/2005 | Morita et al. |
| 8,339,499 B2 | 12/2012 | Ohuchi | | 2005/0248652 A1 | 11/2005 | Firestone et al. |
| 2002/0045450 A1 | 4/2002 | Shimizu et al. | | 2005/0251760 A1 | 11/2005 | Sato et al. |
| 2002/0047892 A1 | 4/2002 | Gonsalves | | 2005/0265276 A1 | 12/2005 | Takeda et al. |
| 2002/0070801 A1 | 6/2002 | Ferianz | | 2005/0268823 A1 | 12/2005 | Bakker et al. |
| 2002/0105922 A1* | 8/2002 | Jabbari et al. ................. 370/328 | | 2005/0271013 A1 | 12/2005 | Shaheen |
| 2002/0106120 A1 | 8/2002 | Brandenburg et al. | | 2006/0007862 A1 | 1/2006 | Sayeedi et al. |
| 2002/0108125 A1 | 8/2002 | Joao | | 2006/0013495 A1 | 1/2006 | Duan et al. |
| 2002/0110104 A1 | 8/2002 | Surdila et al. | | 2006/0017807 A1 | 1/2006 | Lee et al. |
| 2002/0113827 A1 | 8/2002 | Perlman et al. | | 2006/0026671 A1 | 2/2006 | Potter et al. |
| 2002/0114392 A1 | 8/2002 | Sekiguchi et al. | | 2006/0028983 A1 | 2/2006 | Wright |
| 2002/0118890 A1 | 8/2002 | Rondinelli | | 2006/0028986 A1 | 2/2006 | Kwon et al. |
| 2002/0126626 A1 | 9/2002 | Singh | | 2006/0038878 A1 | 2/2006 | Takashima et al. |
| 2002/0131608 A1 | 9/2002 | Lobb et al. | | 2006/0048070 A1 | 3/2006 | Taylor et al. |
| 2002/0140804 A1 | 10/2002 | Colmenarez et al. | | 2006/0056056 A1 | 3/2006 | Ahiska et al. |
| 2002/0149672 A1 | 10/2002 | Clapp et al. | | 2006/0066717 A1 | 3/2006 | Miceli |
| 2002/0163538 A1 | 11/2002 | Shteyn | | 2006/0067271 A1 | 3/2006 | Chen et al. |
| 2002/0186528 A1 | 12/2002 | Huang | | 2006/0070111 A1 | 3/2006 | Kurosawa |
| 2002/0196737 A1* | 12/2002 | Bullard ........................... 370/231 | | 2006/0072813 A1 | 4/2006 | Matsumoto et al. |
| 2003/0017872 A1 | 1/2003 | Oishi et al. | | 2006/0082643 A1 | 4/2006 | Richards |
| 2003/0048218 A1 | 3/2003 | Milnes et al. | | 2006/0093128 A1 | 5/2006 | Oxford |
| 2003/0071932 A1 | 4/2003 | Tanigaki | | 2006/0095943 A1 | 5/2006 | Demircin et al. |
| 2003/0072460 A1 | 4/2003 | Gonopolskiy et al. | | 2006/0100004 A1 | 5/2006 | Kim et al. |
| 2003/0142650 A1 | 7/2003 | Fan | | 2006/0104297 A1* | 5/2006 | Buyukkoc et al. ............. 370/409 |
| 2003/0149724 A1 | 8/2003 | Chang | | 2006/0104470 A1 | 5/2006 | Akino |
| 2003/0160861 A1 | 8/2003 | Barlow et al. | | 2006/0120307 A1 | 6/2006 | Sahashi |
| 2003/0179285 A1 | 9/2003 | Naito | | 2006/0121568 A1 | 6/2006 | Drapeau et al. |
| 2003/0182431 A1 | 9/2003 | Sturniolo et al. | | 2006/0125691 A1 | 6/2006 | Menache et al. |
| 2003/0185303 A1 | 10/2003 | Hall | | 2006/0126878 A1 | 6/2006 | Takumai et al. |
| 2003/0197687 A1 | 10/2003 | Shetter | | 2006/0142008 A1 | 6/2006 | Lee et al. |
| 2003/0234685 A1 | 12/2003 | Ranmuthu | | 2006/0152489 A1 | 7/2006 | Sweetser et al. |
| 2004/0003411 A1 | 1/2004 | Nakai et al. | | 2006/0152575 A1 | 7/2006 | Amiel et al. |
| 2004/0009770 A1 | 1/2004 | Sivanandan et al. | | 2006/0158509 A1 | 7/2006 | Kenoyer et al. |
| 2004/0032906 A1 | 2/2004 | Lillig | | 2006/0168302 A1 | 7/2006 | Boskovic et al. |
| 2004/0038169 A1 | 2/2004 | Mandelkern et al. | | 2006/0170769 A1 | 8/2006 | Zhou |
| 2004/0039778 A1 | 2/2004 | Read et al. | | 2006/0181607 A1 | 8/2006 | McNelley et al. |
| 2004/0061787 A1 | 4/2004 | Liu et al. | | 2006/0193272 A1 | 8/2006 | Chou et al. |
| 2004/0085667 A1 | 5/2004 | Chung et al. | | 2006/0200518 A1 | 9/2006 | Sinclair et al. |
| 2004/0091232 A1 | 5/2004 | Appling, III | | 2006/0217112 A1 | 9/2006 | Mo |
| 2004/0118984 A1 | 6/2004 | Kim et al. | | 2006/0233120 A1 | 10/2006 | Eshel et al. |
| 2004/0119814 A1 | 6/2004 | Clisham et al. | | 2006/0251038 A1 | 11/2006 | Tamura et al. |
| 2004/0127258 A1 | 7/2004 | Taketsugu | | 2006/0256187 A1 | 11/2006 | Sheldon et al. |
| 2004/0164858 A1 | 8/2004 | Lin | | 2006/0264207 A1 | 11/2006 | Tamura et al. |
| 2004/0165060 A1 | 8/2004 | McNelley et al. | | 2006/0268845 A1 | 11/2006 | He et al. |

| | | | | | | |
|---|---|---|---|---|---|---|
| 2006/0284786 A1 | 12/2006 | Takano et al. | | 2009/0172596 A1 | 7/2009 | Yamashita |
| 2006/0289772 A1 | 12/2006 | Johnson et al. | | 2009/0174764 A1 | 7/2009 | Chadha et al. |
| 2007/0014259 A1 | 1/2007 | Fajardo et al. | | 2009/0183122 A1 | 7/2009 | Webb et al. |
| 2007/0019621 A1* | 1/2007 | Perry et al. .............. 370/352 | | 2009/0193345 A1 | 7/2009 | Wensley et al. |
| 2007/0022388 A1 | 1/2007 | Jennings | | 2009/0204538 A1 | 8/2009 | Ley et al. |
| 2007/0039030 A1 | 2/2007 | Romanowich et al. | | 2009/0207233 A1 | 8/2009 | Mauchly et al. |
| 2007/0040903 A1 | 2/2007 | Kawaguchi | | 2009/0207234 A1 | 8/2009 | Chen et al. |
| 2007/0060097 A1 | 3/2007 | Edge et al. | | 2009/0217199 A1 | 8/2009 | Hara et al. |
| 2007/0070177 A1 | 3/2007 | Christensen | | 2009/0228807 A1 | 9/2009 | Lemay |
| 2007/0074123 A1 | 3/2007 | Omura et al. | | 2009/0244257 A1 | 10/2009 | MacDonald et al. |
| 2007/0080845 A1 | 4/2007 | Amand | | 2009/0256901 A1 | 10/2009 | Mauchly et al. |
| 2007/0112966 A1 | 5/2007 | Eftis et al. | | 2009/0260060 A1 | 10/2009 | Smith et al. |
| 2007/0120971 A1 | 5/2007 | Kennedy | | 2009/0265628 A1 | 10/2009 | Bamford et al. |
| 2007/0140337 A1 | 6/2007 | Lim et al. | | 2009/0279476 A1 | 11/2009 | Li et al. |
| 2007/0153712 A1 | 7/2007 | Fry et al. | | 2009/0322082 A1 | 12/2009 | Wagoner |
| 2007/0157119 A1 | 7/2007 | Bishop | | 2009/0324023 A1 | 12/2009 | Tian et al. |
| 2007/0159523 A1 | 7/2007 | Hillis et al. | | 2010/0005419 A1 | 1/2010 | Miichi et al. |
| 2007/0162751 A1 | 7/2007 | Braskich et al. | | 2010/0027907 A1 | 2/2010 | Cherna et al. |
| 2007/0162866 A1 | 7/2007 | Matthews et al. | | 2010/0030389 A1 | 2/2010 | Palmer et al. |
| 2007/0183661 A1 | 8/2007 | El-Maleh et al. | | 2010/0049542 A1 | 2/2010 | Benjamin et al. |
| 2007/0188597 A1 | 8/2007 | Kenoyer et al. | | 2010/0082557 A1 | 4/2010 | Gao et al. |
| 2007/0192381 A1 | 8/2007 | Padmanabhan | | 2010/0118112 A1 | 5/2010 | Nimri et al. |
| 2007/0206091 A1 | 9/2007 | Dunn et al. | | 2010/0123770 A1 | 5/2010 | Friel et al. |
| 2007/0206556 A1 | 9/2007 | Yegani et al. | | 2010/0171807 A1 | 7/2010 | Tysso |
| 2007/0208855 A1 | 9/2007 | Yegani et al. | | 2010/0171808 A1 | 7/2010 | Harrell et al. |
| 2007/0213097 A1 | 9/2007 | Taketsugu | | 2010/0183199 A1 | 7/2010 | Smith et al. |
| 2007/0217406 A1* | 9/2007 | Riedel et al. .............. 370/389 | | 2010/0199228 A1 | 8/2010 | Latta et al. |
| 2007/0217500 A1 | 9/2007 | Gao et al. | | 2010/0201823 A1 | 8/2010 | Zhang et al. |
| 2007/0229250 A1 | 10/2007 | Recker et al. | | 2010/0205281 A1 | 8/2010 | Porter et al. |
| 2007/0240073 A1 | 10/2007 | McCarthy et al. | | 2010/0205543 A1 | 8/2010 | Von Werther et al. |
| 2007/0242638 A1 | 10/2007 | Arkko et al. | | 2010/0208078 A1 | 8/2010 | Tian et al. |
| 2007/0247470 A1 | 10/2007 | Dhuey et al. | | 2010/0225732 A1 | 9/2010 | De Beer et al. |
| 2007/0248078 A1 | 10/2007 | Gundavelli et al. | | 2010/0225735 A1 | 9/2010 | Shaffer et al. |
| 2007/0249334 A1 | 10/2007 | Oswal et al. | | 2010/0259619 A1 | 10/2010 | Nicholson |
| 2007/0250567 A1 | 10/2007 | Graham et al. | | 2010/0262367 A1 | 10/2010 | Riggins et al. |
| 2007/0250620 A1 | 10/2007 | Shah et al. | | 2010/0268843 A1 | 10/2010 | Van Wie et al. |
| 2007/0263079 A1 | 11/2007 | Graham et al. | | 2010/0277563 A1 | 11/2010 | Gupta et al. |
| 2007/0273752 A1 | 11/2007 | Chambers et al. | | 2010/0283829 A1 | 11/2010 | De Beer et al. |
| 2007/0279483 A1 | 12/2007 | Beers et al. | | 2010/0306703 A1 | 12/2010 | Bourganel et al. |
| 2007/0279484 A1 | 12/2007 | Derocher et al. | | 2010/0313148 A1 | 12/2010 | Hochendoner et al. |
| 2007/0281743 A1 | 12/2007 | Palin et al. | | 2010/0316232 A1 | 12/2010 | Acero et al. |
| 2008/0043618 A1 | 2/2008 | Iyer | | 2010/0325547 A1 | 12/2010 | Keng et al. |
| 2008/0046840 A1 | 2/2008 | Melton et al. | | 2011/0008017 A1 | 1/2011 | Gausereide |
| 2008/0077390 A1 | 3/2008 | Nagao | | 2011/0029868 A1 | 2/2011 | Moran et al. |
| 2008/0077883 A1 | 3/2008 | Kim et al. | | 2011/0063467 A1 | 3/2011 | Tanaka |
| 2008/0084429 A1 | 4/2008 | Wissinger | | 2011/0082808 A1 | 4/2011 | Beykpour et al. |
| 2008/0119211 A1 | 5/2008 | Paas et al. | | 2011/0085016 A1 | 4/2011 | Kristiansen et al. |
| 2008/0134098 A1 | 6/2008 | Hoglund et al. | | 2011/0090303 A1 | 4/2011 | Wu et al. |
| 2008/0136896 A1 | 6/2008 | Graham et al. | | 2011/0109642 A1 | 5/2011 | Chang et al. |
| 2008/0148187 A1 | 6/2008 | Miyata et al. | | 2011/0113348 A1 | 5/2011 | Twiss et al. |
| 2008/0151038 A1 | 6/2008 | Khouri et al. | | 2011/0164106 A1 | 7/2011 | Kim |
| 2008/0167078 A1 | 7/2008 | Eibye | | 2011/0202878 A1 | 8/2011 | Park et al. |
| 2008/0208444 A1 | 8/2008 | Ruckart | | 2011/0225534 A1 | 9/2011 | Wala |
| 2008/0212503 A1 | 9/2008 | Lipford et al. | | 2011/0242266 A1 | 10/2011 | Blackburn et al. |
| 2008/0212677 A1 | 9/2008 | Chen et al. | | 2011/0249081 A1 | 10/2011 | Kay et al. |
| 2008/0215974 A1 | 9/2008 | Harrison et al. | | 2011/0249086 A1 | 10/2011 | Guo et al. |
| 2008/0215993 A1 | 9/2008 | Rossman | | 2011/0276901 A1 | 11/2011 | Zambetti et al. |
| 2008/0218582 A1 | 9/2008 | Buckler | | 2011/0279627 A1 | 11/2011 | Shyu |
| 2008/0232692 A1 | 9/2008 | Kaku | | 2011/0319885 A1 | 12/2011 | Skwarek et al. |
| 2008/0240237 A1 | 10/2008 | Tian et al. | | 2012/0026278 A1 | 2/2012 | Goodman et al. |
| 2008/0240571 A1 | 10/2008 | Tian et al. | | 2012/0038742 A1 | 2/2012 | Robinson et al. |
| 2008/0246833 A1 | 10/2008 | Yasui et al. | | 2012/0169838 A1 | 7/2012 | Sekine |
| 2008/0256474 A1 | 10/2008 | Chakra et al. | | 2012/0226997 A1 | 9/2012 | Pang |
| 2008/0259881 A1 | 10/2008 | Hancock et al. | | 2012/0266082 A1 | 10/2012 | Webber |
| 2008/0261569 A1 | 10/2008 | Britt et al. | | 2012/0297342 A1 | 11/2012 | Jang et al. |
| 2008/0266380 A1 | 10/2008 | Gorzynski et al. | | 2012/0327173 A1 | 12/2012 | Couse et al. |
| 2008/0267282 A1 | 10/2008 | Kalipatnapu et al. | | | | |
| 2008/0276184 A1 | 11/2008 | Buffet et al. | | FOREIGN PATENT DOCUMENTS | | |
| 2008/0297586 A1 | 12/2008 | Kurtz et al. | | CN | 101385316 | 3/2009 |
| 2008/0298571 A1 | 12/2008 | Kurtz et al. | | CN | 101438344 A | 5/2009 |
| 2008/0303901 A1 | 12/2008 | Variyath et al. | | CN | 101953158 A | 1/2011 |
| 2009/0009593 A1 | 1/2009 | Cameron et al. | | CN | 102067593 | 5/2011 |
| 2009/0012633 A1 | 1/2009 | Liu et al. | | EP | 502600 A2 | 9/1992 |
| 2009/0037827 A1 | 2/2009 | Bennetts | | EP | 0 650 299 | 10/1994 |
| 2009/0051756 A1 | 2/2009 | Trachtenberg | | EP | 0 714 081 | 11/1995 |
| 2009/0115723 A1 | 5/2009 | Henty | | EP | 0 740 177 | 4/1996 |
| 2009/0119603 A1 | 5/2009 | Stackpole | | EP | 1075123 | 2/2001 |
| 2009/0122867 A1 | 5/2009 | Mauchly et al. | | EP | 143745 A2 | 10/2001 |
| 2009/0163207 A1 | 6/2009 | Randall et al. | | EP | 1 178 352 A1 | 6/2002 |

| | | |
|---|---|---|
| EP | 1 589 758 A1 | 10/2005 |
| EP | 1701308 A2 | 9/2006 |
| EP | 1768058 A2 | 3/2007 |
| EP | 1994725 | 8/2007 |
| EP | 1997325 | 12/2008 |
| EP | 2073543 A1 | 6/2009 |
| EP | 1997105 | 6/2010 |
| EP | 2255531 | 12/2010 |
| EP | 22777308 | 1/2011 |
| EP | 1429567 | 2/2012 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 03/063441 | 7/2003 |
| WO | WO 03/084096 | 10/2003 |
| WO | WO 2004/004378 | 1/2004 |
| WO | WO 2005/013001 A2 | 2/2005 |
| WO | WO 2005/031001 A3 | 2/2005 |
| WO | WO 2006/007574 | 1/2006 |
| WO | WO 2006/072755 | 7/2006 |
| WO | WO 2007/098165 | 8/2007 |
| WO | WO 2007/098245 | 8/2007 |
| WO | WO 2007/104050 | 9/2007 |
| WO | WO2007/106157 | 9/2007 |
| WO | WO2007/123946 | 11/2007 |
| WO | WO 2007/123960 A2 | 11/2007 |
| WO | WO 2007/123960 A3 | 11/2007 |
| WO | WO2008/039371 | 4/2008 |
| WO | WO 2008/040258 | 4/2008 |
| WO | WO 2008/101117 A1 | 8/2008 |
| WO | WO 2008/118887 A2 | 10/2008 |
| WO | WO 2008/118887 A3 | 10/2008 |
| WO | WO 2009/102503 A2 | 8/2009 |
| WO | WO 2009/102503 A3 | 8/2009 |
| WO | WO 2009/120814 A2 | 10/2009 |
| WO | WO 2009/120814 A3 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO2012/033716 | 3/2012 |

OTHER PUBLICATIONS

P. Yegani, et al., "GRE Key Extension for Mobile IPv4", 9 pages, Network Working Group, Aug. 5, 2006.
U.S. Appl. No. 12/234,291, filed Sep. 19, 2008, entitled "System and Method for Enabling Communication Sessions in a Network Environment," Inventors: Yifan Gao et al.
U.S. Appl. No. 12/366,593, filed Feb. 5, 2009, entitled "System and Method for Depth Perspective Image Rendering," Inventors; J. William Mauchly et al.
U.S. Appl. No. 12/475,075, filed May 29, 2009, entitled "System and Method for Extending Communications Between Participants in a Conferencing Environment," Inventors: Brian J. Baldino et al.
U.S. Appl. No. 12/400,540, filed Mar. 9, 2009, entitled "System and Method for Providing Three Dimensional Video Conferencing in a Network Environment," Inventors: Karthik Dakshinamoorthy et al.
U.S. Appl. No. 12/400,582, filed Mar. 9, 2009, entitled "System and Method for Providing Three Dimensional Imaging in a Network Environment," Inventors: Shrnuel Shaffer et al.
U.S. Appl. No. 12/539,461, filed Aug. 11, 2009, entitled "System and Method for Verifying Parameters in an Audiovisual Environment," Inventor: James M. Alexander.
U.S. Appl. No. 12/463,505, flied May 11, 2009, entitled "System and Method for Translating Communications Between Participants in a Conferencing Environment," Inventors: Marthinus F. De Beer et al.
U.S. Appl. No. 12/727,089, filed Mar. 18, 2010, entitled "System and Method for Enhancing Video Images in a Conferencing Environment," Inventors: Joseph T, Friel.

U.S. Appl. No. 12/781,722, filed May 17, 2010, entitled "System and Method for Providing Retracting Optics in a Video Conferencing Environment," Inventor(s): Joseph T. Friel, et al.
U.S. Appl. No. 12/877,833, filed Sep. 8, 2010, entitled "System and Method for Skip Coding During Video Conferencing in a Network Environment," Inventors: Dihong Tian et al.
U.S. Appl. No. 12/870,687, filed Aug. 27, 2010, entitled "System and Method for Producing a Performance Via Video Conferencing in a Network Environment," Inventors: Michael A. Arnao et al.
U.S. Appl. No. 12/912,556, filed Oct. 26, 2010, entitled "System and Method for Provisioning Flows in a Mobile Network Environment," Inventors: Balaji Vankat Vankataswami, et al.
U.S. Appl. No. 12/949,614, filed Nov. 18, 2010, entitled "System and Method for Managing Optics in a Video Environment," Inventors: Torence Lu, et al.
U.S. Appl. No. 12/873,100, filed Aug. 31, 2010, entitled "System and Method for Providing Depth Adaptive Video Conferencing," Inventors: J. William Mauchly et al.
U.S. Appl. No. 12/946,679, filed Nov. 15, 2010, entitled "System and Method for Providing Camera Functions in a Video Environment," Inventors: Peter A.J. Fornell, et al.
U.S. Appl. No. 12/946,695, filed Nov. 15, 2010, entitled "System and Method for Providing Enhanced Audio in a Video Environment," Inventors: Wei Li, et al.
U.S. Appl. No. 12/907,914, filed Oct. 19, 2010, entitled "System and Method for Providing Videomail in a Network Environment," Inventors: David J. Mackie et al.
U.S. Appl. No. 12/950,786, filed Nov. 19, 2010, entitled "System and Method for Providing Enhanced Video Processing in a Network Environment," Inventor[s]: David J. Mackie.
U.S. Appl. No. 12/907,919, filed Oct. 19, 2010, entitled "System and Method for Providing Connectivity in a Network Environment," Inventors: David J. Mackie et al.
U.S. Appl. No. 12/946,704, filed Nov. 15, 2010, entitled "System and Method for Providing Enhanced Graphics in a Video Environment," Inventors: John M. Kanalakis, Jr., et al.
U.S. Appl. No. 12/957,116, filed Nov. 30, 2010, entitled "System and Method for Gesture Interface Control," Inventors: Shuan K. Kirby, et al.
U.S. Appl. No. 12/907,925, filed Oct. 19, 2010, entitled "System and Method for Providing a Pairing Mechanism in a Video Environment," Inventors: Gangfeng Kong et al.
U.S. Appl. No. 12/939,037, filed Nov. 3, 2010, entitled "System and Method for Managing Flows in a Mobile Network Environment," Inventors: Balaji Venkat Venkataswami et al.
U.S. Appl. No. 12/946,709, filed Nov. 15, 2010, entitled "System and Method for Providing Enhanced Graphics in a Video Environment," Inventors: John M. Kanalakis, Jr., et al.
U.S. Appl. No. 12/784,257, filed May 20, 2010, entitled "implementing Selective Image Enhancement," Inventors: Dihong Tian et al.
Design U.S. Appl. No. 29/375,624, filed Sep. 24, 2010, entitled "Mounted Video Unit," Inventor(s): Ashok T. Desai et al.
Design U.S. Appl. No. 29/375,627, filed Sep. 24, 2010, entitled "Mounted Video Unit," Inventor(s): Ashok T. Desai et al.
Design U.S. Appl. No. 29/369,951, filed Sep. 15, 2010, entitled "Video Unit With Integrated Features," Inventor(s): Kyle A. Buzzard et al.
Design U.S. Appl. No. 29/376,458, filed Sep. 22, 2010, entitled "Video Unit With Integrated Features," Inventor(s): Kyle A. Buzzard et al.
Design U.S. Appl. No. 29/358,009, filed Mar. 21, 2010, entitled "Free-Standing Video Unit," Inventor(s): Ashok T. Desai et al.
Design U.S. Appl. No. 29/375,619, filed Sep. 24, 2010, entitled "Free-Standing Video Unit," Inventor(s): Ashok T. Desai et al.
Design U.S. Appl. No. 29/381,245, filed Dec. 16, 2010, entitled "Interface Element," Inventor(s): John M. Kanalakis, Jr., et al.
Design U.S. Appl. No. 29/381,250, filed Dec. 16, 2010, entitled "Interface Element," Inventor(s): John M. Kanalakis, Jr., et al.
Design U.S. Appl. No. 29/381,254, filed Dec. 16, 2010, entitled "Interface Element," Inventor(s): John M. Kanalakis, Jr., et al.
Design U.S. Appl. No. 29/381,256, flied Dec. 16, 2010, entitled "Interface Element," Inventor(s): John M. Kanalakis, Jr., et al.

Design U.S. Appl. No. 29/381,259, filed Dec. 16, 2010, entitled "Interface Element," Inventor(s): John M. Kanalakis, Jr., et al.
Design U.S. Appl. No. 29/381,260, filed Dec. 16, 2010, entitled "Interface Element," Inventor(s): John M. Kanalakis, Jr., et al.
Design U.S. Appl. No. 29/381,262, filed Dec. 16, 2010, entitled "Interface Element," Inventor(s): John M. Kanalakis, Jr., et al.
Design U.S. Appl. No. 29/381,264, filed Dec. 16, 2010, entitled "Interface Element," Inventor(s): John M. Kanalakis, Jr., et al.
"3D Particles Experiments in AS3 and Flash CS3," [retrieved and printed on Mar. 18, 2010]; 2 pages; http://www.flashandmath.com/advanced/fourparticles/notes.html.
3G, "World's First 3G Video Conference Service with New TV Commercial," Apr. 28, 2005, 4 pages; http://www.3g.co.uk/PR/April2005/1383.htm.
Active8-3D—Holographic Projection—3D Hologram Retail Display & Video Project, [retrieved and printed on Feb. 24, 2009], http://www.activ8-3d.co.uk/3d_holocubes; 1 page.
Andersson, L., et al., "LDP Specification," Network Working Group, RFC 3036, Jan. 2001, 133 pages; http://tools.ietf.org/html/rfc3036.
Arrington, Michael, "eJamming—Distributed Jamming," TechCrunch; Mar. 16, 2006; http://www.techcrunch.com/2006/03/16/ejamming-distributed-jamming/; 1 page.
Avrithis, Y., et al., "Color-Based Retrieval of Facial Images," European Signal Processing Conference (EUSIPCO '00), Tampere, Finland; Sep. 2000; http://www.image.ece.ntua.gr/~ntsap/presentations/eusipco00.ppt#256; 18 pages.
Awduche, D., et al., "Requirements for Traffic Engineering over MPLS," Network Working Group, RFC 2702, Sep. 1999, 30 pages; http://tools.ietf.org/pdf/rfc2702.pdf.
Bakstein, Hynek, et al., "Visual Fidelity of Image Based Rendering," Center for Machine Perception, Czech Technical University, Proceedings of the Computer Vision, Winter 2004, http://www.benago.dk/publications/Bakstein-Pajdla-CVWW04.pdf; 10 pages.
Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.
Berzin, O., et al., "Mobility Support Using MPLS and MP-BGP Signaling," Network Working Group, Apr. 28, 2008, 60 pages; http://www.potaroo.net/ietf/all-ids/draft-berzin-malis-mpls-mobility-01.txt.
Boccaccio, Jeff; CEPro, "Inside HDMI CEC: The Little-Known Control Feature," Dec. 28, 2007; http://www.cepro.com/_article/print/inside_hdmi_cec_the_little_known_control_feature; 2 pages.
Bücken R: "Bildfernsprechen: Videokonferenz vom Arbeitsplatz aus" Funkschau, Weka Fachzeitschriften Verlag, Poing, DE, No. 17, Aug. 14, 1986, pp. 41-43, XP002537729; ISSN: 0016-2841, p. 43, left-hand column, line 34-middle column, line 24.
Chan, Eric, et al., "Experiments on block-matching techniques for video coding" Multimedia Systems; 9 Springer-Verlag 1994, Multimedia Systems (1994) 2 pages.
Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.
Chen, Jason, "iBluetooth Lets iPhone Users Send and Receive Files Over Bluetooth," Mar. 13, 2009; http://i.gizmodo.com/5169545/ibluetooth-lets-iphone-users-send-and-receive-files-over-biuetooth; 1 page.
Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1&ved=0CB4QFjAA&url=http%3A%2F%2Fcites eerx.ist.psu.edu%2Fviewdoc%2Fdownload%3Fdoi%3D10.1.1.93.103%26rep%3Drep1%26type%3Dpdf& ei= A28RTLKRDeftnQe XzZGRAw& usg=AFQjCNHpwj5MwjgGp-3goVzSWad6CO-Jzw.
"Cisco Expo Germany 2009 Opening," Posted on YouTube on May 4, 2009; http://www.youtube.com/watch?v=SDKsaSlz4MK; 2 pages.

Cisco: Bill Mauchly and Mod Marathe; UNC: Henry Fuchs, et al., "Depth-Dependent Perspective Rendering," Apr. 15, 2008; 6 pages.
Costa, Cristina, et al., "Quality Evaluation and Nonuniform Compression of Geometrically Distorted Images Using the Quadtree Distorion Map," EURASIP Journal on Applied Signal Processing, Jan. 7, 2004, vol. 2004, No. 12; © 2004 Hindawi Publishing Corp.; XP002536356; ISSN: 1110-8657; pp. 1899-1911; http://downloads.hindawi.com/journals/asp/2004/470826.pdf.
Crirninisi, A., et al., "Efficient Dense-Stereo and Novel-view Synthesis for Gaze Manipulation in One-to-one Teleconferencing," Technical Rpt MSR-TR-2003-59, Sep. 2003 [retrieved and printed on Feb. 26, 2009], http://research.microsoft.com/pubs/67266/criminis_techrep2003-59.pdf, 41 pages.
"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.
Daly, S.. et al., "Face-based visually-optimized image sequence coding," Image Processing, 1998, ICIP 98. Proceedings; 1998 International Conference on Chicago, IL; Oct. 4-7, 1998, Los Alamitos; IEEE Computing; vol. 3, Oct. 4, 1998; ISBN: 978-0-8186-8821-8; XP010586786; pp. 443-447.
Diaz, Jesus, "Zcam 3D Camera is Like Wii Without Wiimote and Minority Report Without Gloves," Dec. 15, 2007; http://gizmodo.com/gadgets/zcam-depth-camera-could-be-wii-challenger/zcam-3d-camera-is-like-wii-without-wiimote-and-minority-report-without-gloves-334426.php; 3pages.
Diaz, Jesus, iPhone Bluetooth File Transfer Corning Soon (YES!); Jan. 26, 2009; http://i.gizmodo.com/5138797/iphone-bluetooth-file-transfer-coming-soon-yes; 1page.
Digital Video Enterprises, "DVE Eye Contact Silhouette," 1 page, © DVE 2008; http://www.dvetelepresence.com/products/eyeContactSilhouette.asp.
DVE Digital Video Enterprises, "DVE Tele-Immersion Room," [retrieved and printed on Feb. 5, 2009] http://www.dvetelepresence.com/products/immersion_room.asp; 2 pages.
"Dynamic Displays," copyright 2005-2008 [retrieved and printed on Feb. 24, 2009] http://www.zebraimaging.com/html/lighting_display.html, 2 pages.
ECmag.com "IBS Products," Published Apr. 2009; http://www.ecmag.com/index.cfm?fa=article&articleID=10065; 2 pages.
eJamming Audio, Learn More; [retrieved and printed on May 27, 2010] http://www.ejamming.com/learnmore/; 4 pages.
Electrophysics Glossary, "Infrared Cameras, Thermal Imaging, Night Vision, Roof Moisture Detection," [retrieved and printed on Mar. 18, 2010] http://www.electrophysics.com/Browse/Brw_Glossary.asp; 11 pages.
Farrukh, A., et al., Automated Segmentation of Skin-Tone Regions in Video Sequences, Proceedings IEEE Students Conference, ISCON_apos_02; Aug. 16-17, 2002; pp. 122-128.
Fiala, Mark, "Automatic Projector Calibration Using Self-Identifying Patterns," National Research Council of Canada, Jun. 20-26, 2005; http://www.procams.org/ procams2005/papers/procams05-36.pdf; 6 pages.
Foote, J., et al., "Flycam: Practical Panoramic Video and Automatic Camera Control," in Proceedings of IEEE international Conference on Multimedia and Expo, vol. III, Jul. 30, 2000; pp. 1419-1422; http://citeseerx.ist.psu.edu/viewdoc/versions?doi=10.1.1.138.8686.
France Telecom R&D, "France Telecom's Magic Telepresence Wall—Human Productivity Lab," 5 pages, retrieved and printed on May 17, 2010; http://www.humanproductivitylab.com/archive_blogs/2006/07/11/france_telecoms_magic_telepres_1.php.
Freeman Professor Wilson T., Computer Vision Lecture Slides, "6.869 Advances in Computer Vision: Learning and Interfaces," Spring 2005; 21 pages.
Gemmell, Jim, et al., "Gaze Awareness for Video-conferencing: A Software Approach," IEEE MultiMedia, Oct.-Dec. 2000; vol. 7, No. 4, pp. 26-35.
Gluckman, Joshua, et al., "Rectified Catadioptric Stereo Sensors," 8 pages, retrieved and printed on May 17, 2010; http://cis.poly.edu/~gluckman/papers/cvpr00.pdf.
Gotchev, Atanas, "Computer Technologies for 3D Video Delivery for Home Entertainment," International Conference on Computer Systems and Technologies; CompSysTech, Jun. 12-13, 2008; http://ecet.ecs.ru.acad.bg/cst08/docs/cp/Plenary/P.1.pdf; 6 pages.
Gries, Dan, "3D Particles Experiments in AS3 and Flash C53, Dan's Comments," [retrieved and printed on May 24, 2010] http://www.flashandmath.com/advanced/fourparticles/notes.html; 3 pages.
Guernsey, Lisa, "Toward Better Communication Across the Language Barrier," Jul. 29, 1999; http://www.nytimes.com/1999/07/29/technology/toward-better-communication-across-the-language-barrier.html; 2 pages.
Guili, D., et al., "Orchestral: A Distributed Platform for Virtual Musical Groups and Music Distance Learning over the Internet in JavaTM Technology"; [retrieved and printed on Jun. 6, 2010] http://ieeexplore.ieee.org/stamp/stamp.jsp?tp=&arnumber=778626; 2 pages.
Gundavelli, S., et al., "Proxy Mobile IPv6," Network Working Group, RFC 5213, Aug. 2008, 93 pages; http://tools.ietf.org/pdf/rfc5213.pdf.
Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; XP011115755; pp. 1086-1097.
He, L., et al., "The Virtual Cinematographer: A Paradigm for Automatic Real-Time Camera Control and Directing," Proc. SIGGRAPH, © 1996; http://research.microsoft.com/en-us/um/people/lhe/papers/siggraph96.vc.pdf; 8 pages.
Hepper, D., "Efficiency Analysis and Application of Uncovered Background Prediction in a Low BitRate Image Coder," IEEE Transactions on Communications, vol. 38, No. 9, pp. 1578-1584, Sep. 1990.
Holographic Imaging, "Dynamic Holography for scientific uses, military heads up display and even someday HoloTV Using TI's DMD" [retrieved and printed on Feb. 26, 2009] http://innovation.swmed.edu/_research/instrumentation/res_inst_dev3d.html; 5 pages.
Hornbeck, Larry J., "Digital Light ProcessingTM: A New MEMS-Based Display Technology," [retrieved and printed on Feb. 26, 2009] http://focus.ti.com/pdfs/dlpdmd/17_Digital_Light_Processing_MEMS_display_technology.pdf; 22 pages.
"Infrared Cameras TVS-200-EX," [retrieved and printed on May 24, 2010] http://www.electrophysics.com/Browse/Brw_ProductLineCategory.asp?CategoryID=184&Area=IS; 2 pages.
IR Distribution Category @ Envious Technology, "IR Distribution Category," [retrieved and printed on Apr. 22, 2009] http://www.envioustechnology.com.au/ products/product-list.php?CID=305; 2 pages.
IR Trans—Products and Orders—Ethernet Devices, [retrieved and printed on Apr. 22, 2009] http://www.irtrans.de/en/shop/lan.php; 2 pages.
Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303.
Itoh, Hiroyasu, et al., "Use of a gain modulating framing camera for time-resolved imaging of cellular phenomena," SPIE vol. 2979, 1997, pp. 733-740.
Jamoussi, Bamil, "Constraint-Based LSP Setup Using LDP," MPLS Working Group, Sep. 1999, 34 pages; http://tools.ietf.org/html/draft-ietf-mpls-cr-idp-03.
Jeyatharan, M., et al., "3GPP TFT Reference for Flow Binding," MEXT Working Group, Mar. 2, 2010, 11 pages; http://www.ietf.org/id/draft-jeyatharan-mext-flow-tftemp-reference-00.txt.
Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.
Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.
Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.
Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; http://ip.hhi.de/imedia_G3/assets/pdfs/CVE02.pdf; 8 pages.
Kazutake, Uehira, "Simulation of 3D image depth perception in a 3D display using two stereoscopic displays at different depths," Jan. 30, 2006; http://adsabs.harvard.edu/abs/2006SPIE.6055.408U; 2 pages.
Keijser, Jeroen, et al., "Exploring 3D Interaction in Alternate Control-Display Space Mappings," IEEE Symposium on 3D User Interfaces, Mar. 10-11, 2007, pp. 17-24.
Kim, Y.H., et al., "Adaptive mode decision for H.264 encoder," Electronics letters, vol. 40, issue 19, pp. 1172-1173, Sep. 2004; 2 pages.
Klint, Josh, "Deferred Rendering in Leadwerks Engine;" Copyright Leadwerks Corporation © 2008; http://www.leadwerks.com/files/Deferred_Rendering_in_Leadwerks_Engine.pdf; 10 pages.
Kollarits, R.V., et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=47A1E7E028C26503975E633895D114EC?doi=10.1.1.42.1772&rep=rep1&type=pdf.
Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages; http://fulfillment.umi.com/dissertations/b7afbcb56ba72fdb14d26dfccc6b470f/1291487062/3143800.pdf.
Koyama, S., et al. "A Day and Night Vision MOS Imager with Robust Photonic-Crystal-Baseci RGB-and-IR," Mar. 2008, pp. 754-759; ISSN: 0018-9383; IEE Transactions on Electron Devices, vol. 55, No. 3; http://ieeexplore.ieee.org/stamp/stamp.jsp?tp=&arnumber=4455782&isnumber=4455723.
Lawson, S., "Cisco Plans TelePresence Translation Next Year " Dec. 9, 2008; http://www.pcworld.com/_article/155237/.html?tk=rss_news; 2 pages.
Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/ljy_ICME2004.pdf; 4 pages.
Liu, Z., "Head-Size Equalization for Better Visual Perception of Video Conferencing," Proceedings, IEEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.
Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.
Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNIcri.
Miller, Gregor, et al., "Interactive Free-Viewpoint Video," Centre for Vision, Speech and Signal Processing, [retrieved and printed on Feb. 26, 2009], http://www.ee.surrey.ac.uk/CVSSP/VMRG/_Publications/miller05cvmp.pdf; 10 pages.
Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.
"Minoru from Novo is the worlds first consumer 3D Webcam," Dec. 11, 2008; http://www.minoru3d.com; 4 pages.
Mitsubishi Electric Research Laboratories, copyright 2009 [retrieved and printed on Feb. 26, 2009], http://www.merl.com/projects/3dtv, 2 pages.

National Training Systems Association Home—Main, Interservice/Industry Training, Simulation & Education Conference. Dec. 1-4, 2008; http://ntsa.rnetapress.com/app/home/main.asp?referrer=default; 1 page.

Oh, Hwang-Seok, et al., "Block-Matching Algorithm Based on Dynamic Search Window Adjustment," Dept. of CS, KIAST, 1997, 6 pages; http://citeseerx.ist.psu.edu/viewdoc/similar?doi=10.1.1.29.8621&type=ab.

Opera Over Cisco TelePresence at Cisco Expo 2009, in Hannover Germany—Apr. 28, 29, posted on YouTube on May 5, 2009; http://www.youtube.com/watch?v=xN5jNH5E-38; 1 page.

OptoIQ, "Vision + Automation Products—VideometerLab 2," [retrieved and printed on Mar. 18, 2010], http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml; 11 pages.

OptoIQ, "Anti-Speckle Techniques Uses Dynamic Optics," Jun. 1, 2009; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnlOptoLFWJanuary132010.html; 2 pages.

OptoIQ, "Smart Camera Supports Multipie Interfaces," Jan. 22, 2009; http://www.optoiq.com/index/machine-vision-imaging-processing/display/vsd-article-display/350639/articles/vision-systems-design/daily-product-2/2009/01/smart-camera-supports-multipie-interfaces.html; 2 pages.

OptoIQ, "Vision Systems Design—Machine Vision and Image Processing Technology," [retrieved and printed on Mar. 18, 2010], http://www.optoiq.com/index/machine-vision-imaging-processing.html; 2 pages.

Payatagool, Chris, "Orchestral Manoeuvres in the Light of Telepresence," Telepresence Options, Nov. 12, 2008; http://www.telepresenceoptions.com/2008/11/orchestral_manoeuvres; 2pages.

PCT International Preliminary Report on Patentability mailed Aug. 26, 2010 for PCT/US2009/001070; 10 pages.

PCT International Report of Patentability dated May 15, 2006, for PCT International Application PCT/US2004/021585, 6 pages.

PCT international Search Report mailed Aug. 24, 2010 for PCT/US2010033880; 4 pages.

PCT Notification of Transmittal of the International Search Report and the Written Opinion of the International Searching Authority, or the Declaration for PCT/US2009/064061 mailed Feb. 23, 2010; 14 pages.

PCT "international Search Report and the Written Opinion of the International Searching Authority, or the Declaration," PCT/US2010/026456, dated Jun. 29, 2010; 11 pages.

PCT "Notification of Transmittal of the International Search Report and the Written Opinion of the International Searching Authority, or the Declaration," PCT/US2009/001070, dated Apr. 4, 2009; 14 pages.

PCT "Notification of Transmittal of the International Search Report and the Written Opinion of the International Searching Authority, or the Declaration," PCT/US2009/038310; dated Oct. 10, 2009; 17 pages.

PCT "International Preliminary Report on Patentability and Written Opinion of the international Searching Authority," PCT/US2009/038310; dated Sep. 28, 2010; 10 pages.

PCT "International Preliminary Report on Patentability dated Sep. 29, 2009, International Search Report, and Written Opinion," for PCT International Application PCT/US2008/058079; dated Sep. 18, 2008, 10 pages.

Pixel Tools "Rate Control and H.264: H.264 rate control algorithm dynamically adjusts encoder parameters," [retrieved and printed on Jun. 10, 2010] http://www.pixeltoois.om/rate_control_paper.html; 7 pages.

Radhika, N., et al., "Mobile Dynamic reconfigurable Context aware middleware for Adhoc smart spaces," vol. 22, 2008; http://www.acadjournal.com/2008/ V22/part6/p7; 3 pages.

Rayvel Business-to-Business Products, copyright 2004 [retrieved and printed on Feb. 24, 2009], http://www.rayvel,com/b2b.html; 2 pages.

"Real-time Hand Motion/Gesture Detection for HCl-Demo 2," video clip, YouTube, posted Dec. 17, 2008 by smmy0705, 1 page; www.youtube.com/watch?v=mLT4CFLli8A&feature=related.

Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estmation_pcs06.pdf; 6 pages.

Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.

"Robust Face Localisation Using Motion, Colour & Fusion"; Proc. VIIth Digital Image Computing: Techniques and Applications, Sun C. et al (Eds.), Sydney; XP007905630; pp. 899-908; Dec. 10, 2003; http://www.cmis.csiro.au/Hugues.Talbot/dicta2003/cdrom/pdf/0899.pdf.

Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.

School of Computing, "Bluetooth over IP for Mobile Phones," 2005; http://www.computing.dcu.ie/wwwadmin/fyp-abstract/list/fyp_details05.jsp?year=2005&number=51470574; 1 page.

Schroeder, Erica, "The Next Top Model—Collaboration," Collaboration, The Workspace: A New World of Communications and Collaboration, Mar. 9, 2009; http//blogs.cisco.com/collaboration/comments/the_next_top_model; 3 pages.

SENA, "Industrial Bluetooth," [retrieved and printed on Apr. 22, 2009] http://www.sena.com/products/industrial_bluetooth; 1 page.

Shaffer, Shmuel, "Translation—State of the Art" presentation; Jan. 15, 2009; 22 pages.

Shi, C. et al., "Automatic Image Quality Improvement for Videoconferencing," IEEE ICASSP May 2004; http://research.microsoft.com/pubs/69079/0300701.pdf; 4 pages.

Shum, H.-Y, et al., "A Review of Image-Based Rendering Techniques," in SPIE Proceedings vol. 4067(3); Proceedings of the Conference on Visual Communications and Image Processing 2000, Jun. 20-23, 2000, Perth, Australia; pp. 2-13; https://research.microsoft.com/pubs/68826/review_image_rendering.pdf.

"Simple Hand Gesture Recognition," video clip, YouTube, posted Aug. 25, 2008 by pooh8210, 1 page; http://www.youtube.com/watch?v=F8GVeV0dYl.M&feature=related.

SMARTHOME, "IR Extender Expands Your IR Capabilities," [retrieved and printed on Apr. 22, 2009], http://www.smarthome.com/8121.html; 3 pages.

Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.

Sonoma Wireworks Forums, "Jammin on Rifflink,"0 [retrieved and printed on May 27, 2010] http://www.sonomawireworks.com/forums/viewtopic.php?id=2659; 5 pages.

Sonoma Wireworks Rifflink, [retrieved and printed on Jun. 2, 2010] http://www.sonomawireworks.com/rifflink.php; 3 pages.

Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE—Int. Soc. Opt. Eng USA ISSN: 0277-786X; XP007905596; pp. 78-88.

Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.

Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.

Sun, X., et al., "Region of Interest Extraction and Virtual Camera Control Based on Panoramic Video Capturing," IEEE Trans. Multimedia, Oct. 27, 2003; http://vision.ece.utsb.edu/publications/04mmXdsun.pdf; 14 pages.

Super Home Inspectors or Super Inspectors, [retrieved and printed on Mar. 18, 2010] http://www.umrt.com/PageManager/Default.aspx/PageID=2120325; 3 pages.

Total immersion, Video Gallery, copyright 2008-2009 [retrieved and printed on Feb. 26, 2009], http://www.t-immersion.com/en,video-gallery,36.html, 1 page.

Trevbor Darrell, "A Real-Time Virtual Mirror Display," 1 page, Sep. 9, 1998; http://people.csail.mit.edu/trevor/papers/1998-021/node6.html.

Trucco, E., et al., "Real-Time Disparity Maps for Immersive 3-D Teleconferencing by Hybrid Recursive Matching and Census Transform," [retrieved and printed on May 4, 2010] http://server.cs.ucf.edu/~vision/papers/VidReg-final.pdf; 9 pages.

Tsapatsoulis, N., et al., "Face Detection for Multimedia Applications," Proceedings of the ICIP Sep. 10-13, 2000, Vancouver, BC, Canada; vol. 2, pp. 247-250.

Tsapatsoulis, N., et al., "Face Detection in Color Images and Video Sequences," 10th Mediterranean Electrotechnical Conference (MELECON), May 29-31, 2000; vol. 2; pp. 498-502.

Wachs J., et al., "A Real-time Hand Gesture System Based on Evolutionary Search," Vision; 3$^{rd}$ Quarter 2006, vol. 22, No. 3, 18 pages; http://web.ics.purdue.edu/~jpwachs/papers/3q06vi.pdf.

Wang, Hualu, et al., "A Highly Efficient System for Automatic Face Region Detection inMPEG Video," IEEE Transactions on Circuits and Systems for Video Technology; vol. 7, Issue 4; 1977 pp. 615-628.

Wang, Robert and Jovan Popovic, "Real-Time Hand-Tracking with a Color Glove, ACM Transaction on Graphics" (SIGGRAPH 2009); 28(3), Aug. 2009; 8 pages http://people.csail.mit.edu/rywang/handtracking/s09-hand-tracking.pdf.

Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/tywang/hand.

Wang, Robert and Jovan Popovic, "Gestural user input," video clip, YouTube, posted by rkeltset on May 19, 2010, 1 page; http://www.youtube.com/watch?v=3JWYTtBjdTE.

Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwjkWP6Sw.

Wang, Robert and Jovan Popovic, "Desktop virtual reality," video clip, YouTube, posted by rkeitset on Apr. 8, 2010, 1 page; http://www.youtube.com/watch?v=9rBtm62Lkfk.

Wang, Robert and Jovan Popovic, "Bimanual rotation and scaling," video clip, YouTube posted by rkeltset on Apr. 14, 2010, 1 page; http://www.youtube.com/watch?v=7TPFSCX79U.

Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.

Westerink, P.H., et al., "Two-pass MPEG-2 variable-titrate encoding," IBM Journal of Research and Development, Jul. 1991, vol. 43, No. 4; http://citeseerx.ist.psu.edu/viewdoc/summary?doi=10.1.1.128.421; 18 pages.

Wiegand, T., et al., "Efficient mode selection for block-based motion compensated video coding," Proceedings, 2005 International Conference on Image Processing IIP 2005, pp. 2559-2562; citeseer.ist.psu.edu/wiegand9Sefficient.html.

Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.

Wi-Fi Protected Setup, from Wikipedia, Sep. 2, 2010, 3 pages http://en.wikipedia.org/wiki/Wi-Fi_Protected_Setup.

Wilson, Mark, "Dreamoc 3D Display Turns Any Phone Into Hologram Machine," Oct. 30, 2008; http://gizmodo.com/5070906/dreamoc-3d-display-turns-any-phone-into-hologram-machine; 2 pages.

WirelessDevNet, Melody Launches Bluetooth Over IP, [retrieved and printed on Jun. 5, 2010] http://www.wirelessdevnet.com/news/2001/_155/news5.html; 2 pages.

Xia, F., et al., "Home Agent Initiated Flow Binding for Mobile IPv6," Network Working Group, Oct. 19, 2009, 15 pages; http://tools.ietf.orghtml/draft-xia-mext-ha-init-flow-binding-01.txt.

Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.

Yang, Jie, et al., "A Real-Time Face Tracker," Proceedings 3rd IEEE Workshop on Applications of Computer Vision; 1996; Dec. 2-4, 1996; pp. 142-147; http://www.ri.cmu.edu/pub_files/pub1/yang_jie_1996_1/yang_jie_1996_1.pdf.

Yang, Ming-Hsuan, et al., "Detecting Faces in Images: A Survey," vol. 24, No. 1; Jan. 2002; pp. 34-58; http://vision.ai.uiuc.edu/mhyang/papers/pami02a.pdf.

Yang, Ruigang, et al., "Real-Time Consensus-Based Scene Reconstruction using Commodity Graphics Hardware," Department of Computer Science, University of North Carolina at Chapel Hill; 2002; http://www.cs.unc.edu/Research/stc/publications/yang_pacigra2002.pdf; 10 pages.

Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.

Yoo, Byounghun, et al., "Image-Based Modeling of Urban Buildings Using Aderial Photographs and Digital Maps," Transactions in GIS, 2006, 10(3): p. 377-394.

Zhong, Ren, et al., "Integration of Mobile IP and MPLS," Network Working Group, Jul. 2000, 15 pages; http://tools.ietf.org/html/draft-zhong-mobile-ip-mpls-01.

"Oblong Industries is the developer of the g-speak spatial operation environment," Oblong Industries Information Page, 2 pages, [Retrieved and printed on Dec. 1, 2010] http://oblong.com.

Underkoffler, John, "G-Speak Overview 1828121108," video Clip, Vimeo.com, 1 page, [Retrieved and printed on Dec. 1, 2010] http://vimeo.com/2229299.

Kramer, Kwindla, "Mary Ann de Lares Norris at Thinking Digital," Oblong Industries, Inc. Web Log, Aug. 24, 2010; 1 page; http://oblong.com/articles/0B56hEeJmoHoCwgJ.html.

"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.

Kramer, Kwindla, "Oblong at TED," Oblong Industries, Inc. Web Log, Jun. 6, 2010, 1 page; http://oblong.com/article/0B22LF1S1NVyrOmR.html.

Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.

"John Underkoffler points to the future of UI," video clip and interactive transcript, Video on TED.com, Jun. 2010, 6 pages; http://www.ted.com/talks/john_underkoffler_drive_3d_data_with_a_gesture.html.

Kramer, Kwindla, "Oblong on Bloomberg TV," Oblong Industries, Inc. Web Log, Jan. 28, 2010, 1 page; http://oblong.com/article/0AN__1KD9q990PEnw.html.

Kramer, Kwindla, "g-speak at RISD, Fall 2009," Oblong Industries, Inc. Web Log, Oct. 29, 2009, 1 page; http://oblong.com/article/09uW060q6xRIZYvm.html.

Kramer, Kwindla, "g-speak + TMG," Oblong Industries, inc. Web Log, Mar. 24, 2009, 1 page; http://oblong.com/article/08mM77zpYMm7kFtv.html.

"g-stalt version 1," video clip, YouTube.com, posted by ziggles on Mar. 15, 2009, 1 page; http://youtube.com/watch?v=k8ZAql4mdvk.

Underkoffler, John, "Carlton Sparrell speaks at MIT," Oblong Industries, Inc. Web Log, Oct. 30, 2009, 1 page; http://oblong.com/article/09usAB4l1Ukb6CPw.html.

Underkoffler, John, "Carlton Sparrell at MIT Media Lab," video clip, Vimeo.com, 1 page, [Retrieved and printed Dec. 1, 2010] http://vimeo.com/7355992.

Underkoffler, John, "Oblong at Altitude: Sundance 2009," Oblong Industries, Inc. Web Log, Jan. 20, 2009, 1 page; http://oblong.com/article/08Sr62ron__2akg0D.html.

Underkoffler, John, "Oblong's tamper system 1801011309," video clip, Vimeo.com, 1 page, [Retrieved and printed Dec. 1, 2010] http://vimeo.com/2821182.

Feld, Brad, "Science Fact," Oblong Industries, Inc. Web Log, Nov. 13, 2008, 2 pages, http://oblong.com/article/084H-PKl5Tb9l4Ti.html.

Kwindla Kramer, "g-speak in slices," Oblong Industries, Inc. Web Log Nov. 13, 2008, 6 pages; http://oblong.com/article/0866JqfNrFg1NeuK.html.

Underkoffler, John, "Origins: arriving here," Oblong Industries, Inc, Web Log, Nov. 13, 2008, 5 pages; http://oblong.com/article/085zBpRSY9JeLv2z.html.

Rishel, Christian, "Commercial overview: Platform and Products," Oblong Industries, Inc., Nov. 13, 2008, 3 pages; http://oblong.com/article/086E19gPvDcktAt9.html.

Aug. 2, 2011 Response to PRC Second Office Action from State Intellectual Property Office from Chinese Application 200780005907.5 (English translation of claims only); 12 pages.

PRC Jun. 30, 2011 Third Office Action mailed from the State Intellectual Property Office of the People's Republic of China from Chinese Application No. 200780005846.2; 7 pages.

Sep. 15, 2011 Response to PRC Third Office Action from State Intellectual Property Office from Chinese Application 200780005846.2 (English translation of claims only); 10 pages.

U.S. Appl. No. 13/298,022, filed Nov. 16, 2011, entitled "System and Method for Alerting a Participant in a Video Conference," Inventor(s): TiongHu Lian, et al.

""Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html".

USPTO Feb. 29, 2012 Response to Non-Final Office Action mailed Dec. 28, 2012 from U.S. Appl. No. 11/714,413.

EPO Jan. 19, 2012 Supplementary European Search Report and Written Opinion from Application EP07751189; 5 pages.

EPO Feb. 6, 2012 Supplementary European Search Report and Written Opinion from Application EP07751384; 8 pages.

U.S. Appl. No. 13/036,925, filed Feb. 28, 2011 ,entitled "System and Method for Selection of Video Data in a Video Conference Environment," Inventor(s) Sylvia Olayinka Aya Manfa N'guessan.

U.S. Appl. No. 13/096,772, filed Apr. 28, 2011, entitled "System and Method for Providing Enhanced Eye Gaze in a Video Conferencing Environment," Inventor(s): Charles C. Byers.

U.S. Appl. No. 13/106,002, filed May 12, 2011, entitled "System and Method for Video Coding in a Dynamic Environment," Inventors: Dihong Tian et al.

U.S. Appl. No. 13/098,430, filed Apr. 30, 2011, entitled "System and Method for Transferring Transparency Information in a Video Environment," Inventors: Eddie Collins et al.

U.S. Appl. No. 13/096,795, filed Apr. 28, 2011, entitled "System and Method for Providing Enhanced Eye Gaze in a Video Conferencing Environment," Inventors: Charles C. Byers.

Design U.S. Appl. No. 29/389,651, filed Apr. 14, 2011, entitled "Video Unit With Integrated Features," Inventor(s): Kyle A. Buzzard et al.

Design U.S. Appl. No. 29/389,654, filed Apr. 14, 2011, entitled "Video Unit With Integrated Features," Inventor(s): Kyle A. Buzzard et al.

Gussenhoven, Carlos, "Chapter 5 Transcription of Dutch Intonation," Nov. 9, 2003, 33 pages; http://www.ru.nl/publish/pages/516003/todisun-ah.pdf.

Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.

"Vocative Case," from Wikipedia, [retrieved and printed on Mar. 3, 2011] 11 pages; http://en.wikipedia.org/wiki/Vocative_case.

EPO Communication dated Feb. 25, 2011 for EP09725288.6 (published as EP22777308); 4 pages.

Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.

Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages http://www.umiacs.umd.edu/~knkim/paper/itc-cscc-2000-jgko.pdf.

Veratech Corp., "Phantom Sentinel," © 2006 VeratechAero, 1 page; http://www.veratechcorp.com/phantom.html.

Chien et al., "Efficient moving Object Segmentation Algorithm Using Background Registration Technique," IEEE Transactions on Circuits and Systems for Video Technology, vol. 12, No. 7, Jul. 2002, 10 pages.

EPO Jul. 10, 2012 Response to EP Communication from European Application EP10723445.2.

EPO Sep. 24, 2012 Response to Mar. 20, 2012 EP Communication from European Application EP09725288.6.

PRC Aug. 3, 2012 SIPO First Office Action from Chinese Application No. 200980119121.5; 16 pages.

Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.

PCT Nov. 24, 2011 International Preliminary Report on Patentability from International Application Serial No. PCT/US2010/033880; 6 pages.

PRC Oct. 19, 2011 Fourth Office Action mailed from the State Intellectual Property Office of the People's Republic of China from Chinese Application No. 200780005846.2; 7 pages.

Andreopoulos, Yiannis, et al., "In-Band Motion Compensated Temporal Filtering," Signal Processing: Image Communication 19 (2004) 653-673, 21 pages http://medianetlab.ee.ucla.edu/papers/011.pdf.

Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages http://www.cs.ubc.ca/~murphyk/Software/Kalman/ParticleFilterTutorial.pdf.

Dornaika F., et al., "Head and Facial Animation Tracking Using Appearance-Adaptive Models and Particle Filters," 20040627; 20040627-20040602, Jun. 27, 2004, 22 pages; HEUDIASY Research Lab, http://eprints.pascal-network.org/archive/00001231/01/rtvhci_chapter8.pdf.

Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.

EPO Aug. 15, 2011 Response to EPO Communication mailed Feb. 25, 2011 from European Patent Application No. 09725288.6; 15 pages.

"Eye Tracking," from Wikipedia, (printed on Aug. 31, 2011) 12 pages; http://en.wikipedia.org/wiki/Eye_tracking.

Garg, Ashutosh, et al., "Audio-Visual ISpeaker Detection Using Dynamic Bayesian Networks," IEEE International Conference on Automatic Face and Gesture Recognition, 2000 Proceedings, 7 pages http://www.ifp.illinois.edu/~ashutosh/papers/FG00.pdf.

Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.

Hammadi, Nait Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.

Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].

Lambert, "Polycom Video Communications," © 2004 Polycom, Inc., Jun. 20, 2004 http://www.polycom.com/global/documents/whitepapers/video_communications_h.239 _people_content_polycom_patented_technology.pdf.

Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.

Nakaya, Y., et al. "Motion Compensation Based on Spatial Transformations," IEEE Transactions on Circuits and Systems for Video Technology, Jun. 1994, Abstract Only; http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203.
Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.
PCT Sep. 25, 2007 Notification of Transmittal of the International Search Report from PCT/US06/45895.
PCT Sep. 2, 2008 International Preliminary Report on Patentability (1 page) and the Written Opinion of the ISA (4 pages) from PCT/US2006/045895.
PCT Sep. 11, 2008 Notification of Transmittal of the International Search Report from PCT/US07/09469.
PCT Nov. 4, 2008 International Preliminary Report on Patentability (1 page) and the Written Opinion of the ISA (8 pages) from PCT/US2007/009469.
PCT May 11, 2010 International Search Report from PCT/US2010/024059; 4 pages.
PCT Aug. 23, 2011 International Preliminary Report on Patentability and Written Opinion of the ISA from PCT/US2010/024059; 6 pages.
Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.
Potamianos. G., et a., "An Image Transform Approach for HMM Based Automatic Lipreading," in Proceedings of IEEE ICIP, vol. 3, 1998, 5 pages http://citeseerx.ist.psu.edu/viewdoc/surnmary?doi=10.1.1.13,6802.
Rikert, T.D., et al., "Gaze Estimation using Morphable models," IEEE International Conference on Automatic Face and Gesture Recognition. Apr. 1998; 7 pgs http://citeseer.ist.psu.edu/viewdoc/surnmary?doi=10.1.1.30.9472.
"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.
Tan, Kar-Han, et al., "Appearance-Based Eye Gaze Estimation," In Proceedings IEEE WACV'02, 2002, 5 pages http://citeseer.ist.psu.edu/viewdoc/summary?doi=10.1.1.19.8921.
Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.
Weinstein et al., "Emerging Technologies for Teleconferencing and Telepresence," Wainhouse Research 2005 http://www.ivci.com/pdf/whitepaper-emerging-technologies-for-teleconferencing-and-telepresence.pdf.
Jan. 4, 2012 Response to PRC Fourth Office Action from State Intellectual Property Office from Chines Application 200780005846.2; 10 pages [English translation of Claims only].
USPTO Dec. 28, 2011 Non-Final Office Action from U.S. Appl. No. 11/714,413.
PCT Jan. 23, 2012 International Search Report and Written Opinion of the ISA from International Application Serial No. PCT/US2011/060579; 10 pages.
PCT Jan. 23, 2012 International Search Report and Written Opinion of the ISA from International Application Serial No. PCT/US2011/060584; 11 pages.
PCT Feb. 20, 2012 International Search Report and Written Opinion of the ISA from International Application Serial No. PCT/US2011/061442; 12 pages.
USPTO Jun. 7, 2012 Final Office Action from U.S. Appl. No. 11/714,413.
PCT Sep. 13, 2011 International Preliminary Report on Patentability and the Written Opinion of the ISA from PCT/US2010/026456; 5 pages.
PCT Oct. 12, 2011 International Search Report and Written Opinion of the ISA from PCT/US2011/050380.

EPO Aug. 9, 2012 Response to Feb. 7, 2012 Communication regarding Written Opinion from European Application No. 07751189.7.
EPO Oct. 1, 2012 Communication from European Application No. 07751384; 4 pages.
USPTO Aug. 30, 2012 Request for Continued Examination response to Jun. 7, 2012 Final Office Action from U.S. Appl. No. 11/714,413.
USPTO Oct. 23, 2012 Notice of Allowance from U.S. Appl. No. 11/707,747.
U.S. Appl. No. 13/692,320, filed Dec. 3, 2012 entitled "Decoupling Radio Resource Management from an Access Gateway," Inventor(s): Anand K. Oswal, et al.
EPO Jun. 13, 2012 Response to Communication from European Application No. 07751384.4; 10 pages.
EPO Nov. 3, 2011 Communication from European Application EP10710949.8; 2 pages.
EPO Mar. 12, 2012 Response to EP Communication dated Nov. 3, 2011 from European Application EP10710949.8; 15 pages.
EPO Mar. 20, 2012 Communication from European Application 09725288.6; 6 pages.
"3GPP2," 3rd Generation Partnership Project 2, cdma2000 Wireless IP Network Standard: Introduction, Version 1.0, Feb. 2006, 3GPP2 X.S0011-001-D.
"3GPP2," 3rd Generation Partnership Project 2, cdma2000 Wireless Ip Network Standard: Introduction, Version 1.0, Feb. 2006, 3GPP2 X.S0011-002-D.
"3GPP2," 3rd Generation Partnership Project 2, cdma2000 Wireless IP Networkd Standard: Introduction, Version 1.0, Feb. 2006, 3GPP2 X.S0011-003-D.
"3GPP2," 3rd Generation Partnership Project 2, cdma2000 Wireless lP Network Standard: Introduction, Version 1.0, Feb. 2006, 3GPP2 X.S0011-004-D.
"3GPP2," 3rd Generation Partnership Project 2, cdma2000 Wireless lP Network Standard: Introduction, Version 1.0, Feb. 2006, 3GPP2 X.S0011-005-D.
"3GPP2," 3rd Generation Partnership Project 2, cdma2000 Wireless IP Network Standard: Introduction, Version 1.0, Feb. 2006, 3GPP2 X.S0011-006-D.
EPO Dec. 3, 2009 Supplementary European Search Report and Search Opinion for Application No. 07758263.3; 6 pages.
PCT Jun. 12, 2008 International Search Report for PCT/US07/04617; 2 pages.
PCT Aug. 19, 2008 International Preliminary Report on Patentability and Written Opinion of the International Searching Authority for PCT/US07/04617; 8 pages.
PCT Feb. 7, 2008 international Search Report for PCT/US07/63692; 1 page.
PCT Sep. 9, 2008 International Preliminary Report on Patentability and Written Opinion of the International Searching Authority for PCT/US07/63692; 4 pages.
PCT Jul. 28, 2008 International Search Report for PCT/US07/004415; 1 page.
PCT Sep. 2, 2008 International Preliminary Report on Patentability and Written Opinion of the International Searching Authority for PCT/US07/004415; 4 pages.
PCT Jun. 5, 2008 International Search Report for PCT/US08/55405; 1 page.
PCT Sep. 8, 2009 International Preliminary Report on Patentability and Written Opinion for PCT/US08/55405; 8 pages.
Perkins, C., "RFC 3344 on IP Mobility Support for IPv4,"; http://rft.sunsite.dk/rfc/rfc3344.htl, 99 pages.
Pham, Tung Thanh et al., "An Introduction to Radio Resource Management in Cellular Systems," 8 pages [retrieved and printed Jun. 15, 2011] http://www.item.ntnu.no/fli/cac_tung.pdf.
PRC Nov. 18, 2010 First Office Action from the State Intellectual Property Office of the People's Republic of China from application CN 200780005907.5; 17 pages.
Response Apr. 1, 2011 to PRC First Office Action from the State Intellectual Property Office of the People's Republic of China mailed Nov. 18, 2010 from application CN 200780005907.5; 14 pages.
PRC Nov. 12, 2009 First Office Action from the State Intellectual Property Office of the People's Republic of China from application CN 200780005846.2; 23 pages.

Response Apr. 6, 2010 to PRC First Office Action from the State Intellectual Property Office of the People's Republic of China mailed Nov. 12, 2009 from application CN 200780005846.2; 31 pages.

PRC May 24, 2010 Second Office Action mailed from the State Intellectual Property Office of the People's Republic of China from application CN 1620794A; 13 pages.

Response Aug. 9, 2010 to PRC Second Office Action from the State Intellectual Property Office of the People's Republic of China mailed May 24, 2010 from application CN 200780005846.2 [No English translation available]; 9 pages.

PRC May 18, 2011 Second Office Action from the State Intellectual Property Office of the People's Republic of China from application CN 200780005907.5 [English translation only—Chinese version not available]; 2 pages.

Ylitalo, et al., "Re-thinking Security in IP based Micro-Mobility," downloaded from www.tcs.hut.fi/Studies/T-79.5401/2005AUT/ISCO4-Vlitalo-e-al.pdf; 12 pages.

PRC Dec. 18, 2012 Response to SIPO First Office Action from Chinese Application No. 200980119121.5; 16 pages.

PRC Jan. 7, 2013 SIPO Second Office Action from Chinese Application Serial No. 200980105262.1.

EPO Feb. 7, 2013 Response to EP Communication dated Oct. 1, 2012 from European Application No. 07751384.4.

* cited by examiner

PERFORMANCE OPTIMIZATION WITH INTEGRATED MOBILITY AND MPLS

CROSS-REFERENCES TO RELATED APPLICATIONS

This application claims priority from U.S. Provisional Patent application Ser. No. 60/780,176 filed on Mar. 6, 2006, which is hereby incorporated by reference in its entirety for all purposes.

TECHNICAL FIELD

Particular embodiments generally relate to networking.

BACKGROUND

In mobile IP, mobile device users can move from one network to another without changing their IP address. An IP gateway is used as an aggregation point for user traffic where packets are tunneled through an IP network from a foreign agent (e.g., the IP gateway) to a home agent (e.g., a bearer manager). For example, data is encapsulated in IP packets and sent through the tunnel from the foreign agent to the home agent, and vice versa.

A mobile device may have multiple sessions that are active. For example, a mobile device may have a connection for a voice call session, a web browsing session, an e-mail session, etc. Each of these sessions may have different flows associated with it. That is each flow sends data through a different connection. However, the source and destination IP addresses are the same as the flows are coming from the same IP gateway and destined for the same home agent. Some of the sessions may have low latency requirements that are required by the service being provided. For example, real-time traffic, such as voice over IP (VoIP) and streaming video, requires a high quality of service. However, if the flows are not differentiated for the mobile device, then each flow may be treated similarly. Accordingly, the mobile device may experience high latency on some traffic that requires a very low level of latency.

DESCRIPTION OF EXAMPLE EMBODIMENTS

Overview

In one embodiment, a first node receives data associated with a mobile node. The mobile node includes a plurality of sessions associated with it. For example, the plurality of sessions may be associated with flows for different services, such as voice over IP, web browsing, e-mail, streaming video, etc. A session for the data is determined out of a plurality of sessions. Labels may be provided that correspond to sessions in the plurality of sessions and a label is then determined for the session. The data is sent to the second node in a packet that includes the label. The packet is sent using a label switched path (LSP) in a multi-protocol label switching (MPLS) network. When the second node receives the data, it uses the label to determine a performance treatment to apply to the data. For example, different labels may correspond to the different sessions and different sessions may be associated with different quality of service (QoS) levels. Thus, the second node applies the associated quality of service for the label in forwarding the data.

Example Embodiments

Figure 1:
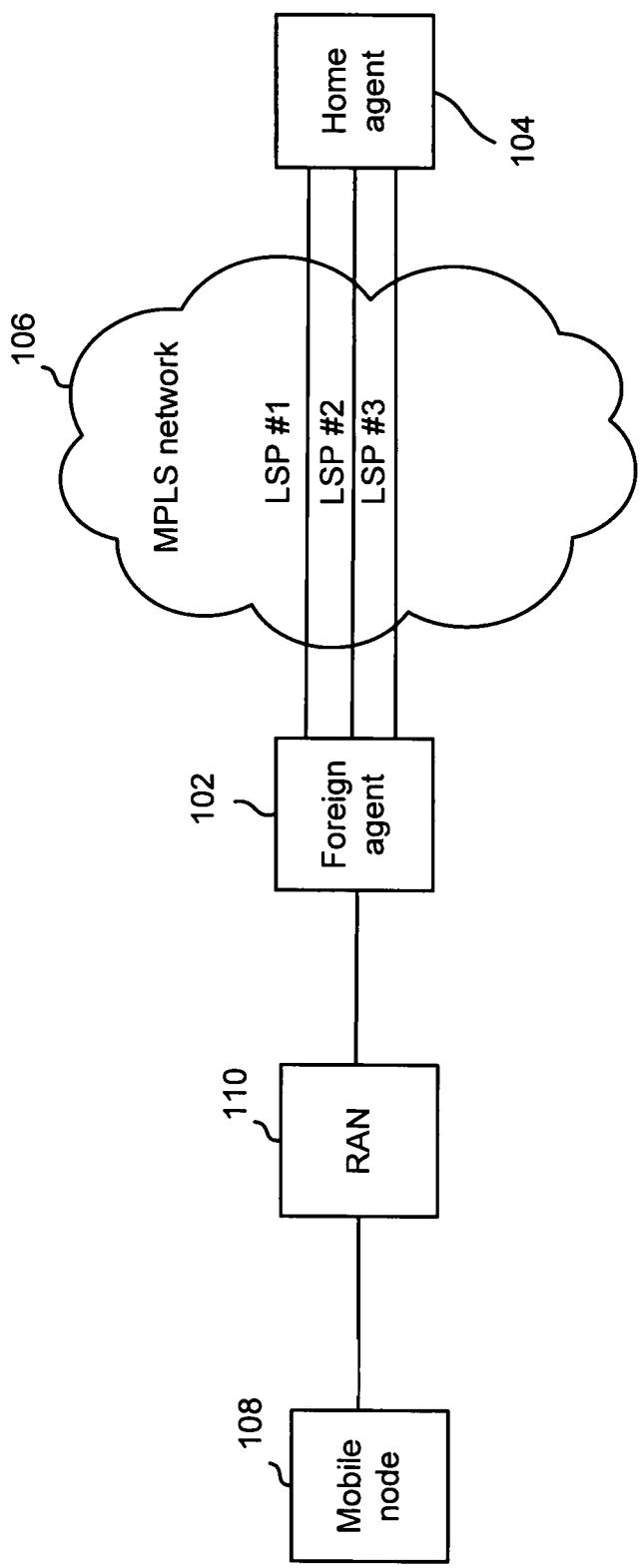
FIG. 1 depicts an example system for providing performance optimization using labels in an MPLS network.

FIG. 1 depicts an example system for providing performance optimization using labels in an MPLS network. As shown, a foreign agent 102, a home agent 104, MPLS network 106, a mobile node 108, and a radio access network (RAN) 110 are provided. It will be understood that other components in the system may also be provided that are not shown.

Foreign agent 102 may be any device that is found in a visiting network. For example, mobile node 108 may roam to various networks that are outside of its home network. When mobile node 108 roams to a different network, it can attach to foreign agent 102. Foreign agent 102 may be any device configured to communicate with the home network for mobile node 108. For example, foreign agent 102 may be an IP gateway, router, etc.

Home agent 104 may be the home agent for mobile node 108 and is located in the home network for mobile node 108. In one embodiment, home agent 104 may be a bearer manager that manages the bearer related services and functionality, such as mobility services, admission control, QoS, etc.

Mobile IP allows mobile node 108 to roam to various visiting networks while maintaining the same IP address. Home agent 104 stores information about mobile node 108, such as the home address for mobile node 108 and its care-of-address (an address for the mobile node in the visiting network). Foreign agent 102 may store information about mobile node 108 when it visits the visiting network, such as a care-of-address, home agent address, etc.

When mobile node 108 wants to communicate with other entities or vice versa, communications may flow through foreign agent 102 and home agent 104. In one embodiment, an MPLS network 106 is used to send packets (or any other datagram) with data between foreign agent 102 and home agent 104. Accordingly, in one example, if mobile node 108 is participating in a voice call, foreign agent 102 may encapsulate the voice data in a packet and send it through MPLS network 106 to home agent 104. Also, home agent 104 may encapsulate voice data for mobile node 108 and send it through MPLS network 106 to foreign agent 102. Foreign agent 102 may then decapsulate each packet and send the data to RAN 110, which can then send the data through layer 2 to mobile node 108.

Different flows are used for the different sessions being used by mobile node 108. For example, services may include voice calls, web browsing, e-mail, video streaming, downloads, file transfer protocol (FTP), etc. Each of these services may require a different flow to be set up to send the data. A flow may be a connection that is established for the sending the data. The data sent for the flow may include the same source and destination IP address. For example, in IP to IP communications between foreign agent 102 and home agent 104, the source may be foreign agent 102 and the destination may be home agent 104. Differentiating between which data is for which flow for mobile node 108 is thus difficult. Because these flows are for different services, different performance treatments may be applied to each flow. A performance treatment may be any process of applying different performance characteristics to a flow. For example, a flow that is transporting data for real-time services, such as voice over IP or video streaming, may require a high quality of service. Thus, a performance treatment may ensure that data in this flow is routed at a certain performance level, such as an expedited forward (eF) quality of service.

To transport data from foreign agent 102 to home agent 104, label switched paths (LSP) are established between foreign agent 102 and home agent 104. Different labels may be assigned to the label switched paths. As is known in MPLS, a label may be included in a packet header and used to route a packet through a label switched path. Accordingly, when foreign agent 102 receives data from mobile node 108, foreign agent 102 can assign a label to the data depending on which flow it should be associated with. For example, label switched path #2 may be the flow for a real-time service such as voice over IP and label #2 is associated with this flow. Accordingly, foreign agent 102 generates a packet and adds label #2 to it. The packet is then sent through MPLS network 106. MPLS network 106 routes the packet through it according to the label attached.

Home agent 104 receives the packet and determines the label associated with it. The label is then used to determine a performance treatment for the data in the packet. For example, label #2 may be associated with a certain quality of service level. This level is then applied by home agent 104 and the data is sent using the determined QoS. For example, the data is mapped to appropriate transport paths using the QoS.

Accordingly, particular embodiments provide a performance treatment to data sent between foreign agent 102 and home agent 104 using the labels included in the packets. Thus, data in packets that are sent through MPLS network 106 may be associated with different flows for mobile node 108 and have different performance treatments applied to the data. Thus, even though data may be sent from the same source for the same destination, the data may be differentiated into different flows using different labels. Thus, different performance treatments can be applied.

Figure 2:
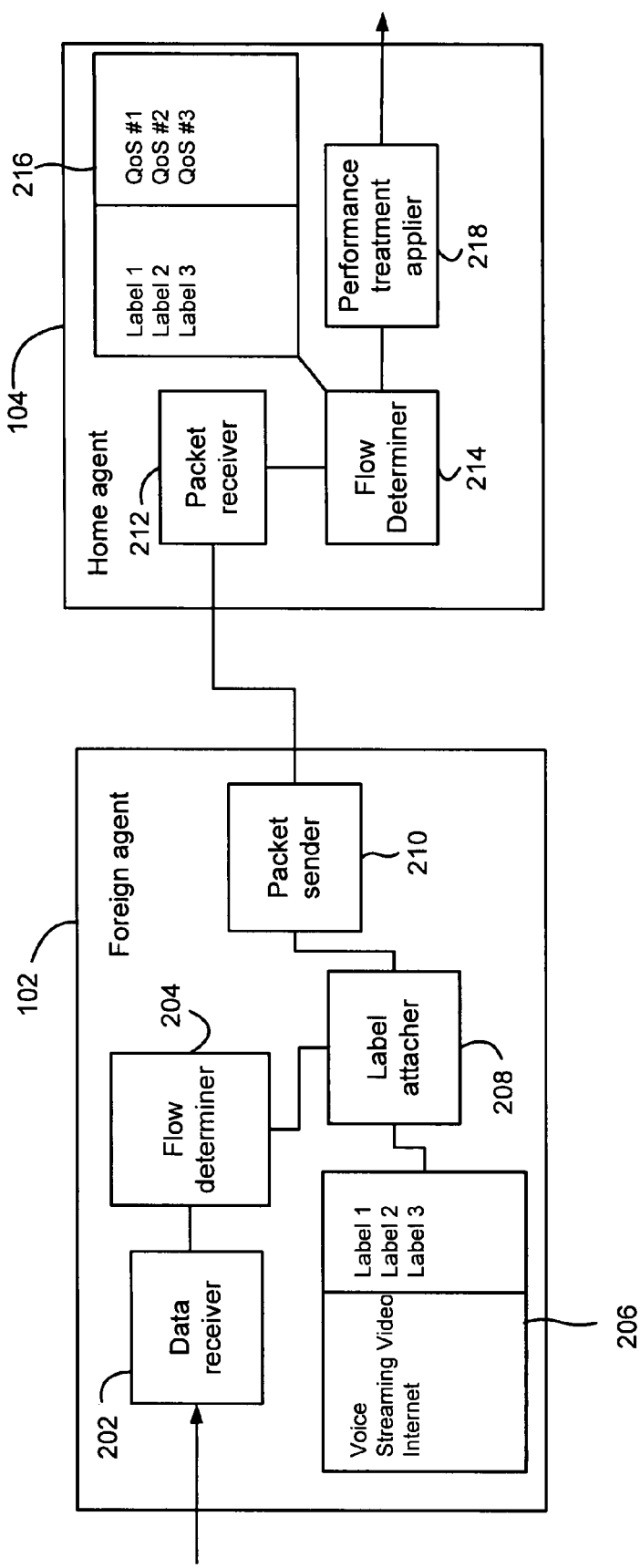
FIG. 2 shows a more detailed embodiment of a foreign agent and a home agent.

FIG. 2 shows a more detailed embodiment of foreign agent 102 and home agent 104. Although the processes described as going from foreign agent 102 to home agent 104, it will be understood that the same flow may be used in reverse.

As shown, foreign agent 102 includes a data receiver 202, a flow determiner 204, a flow table 206, a label attacher 208, and a packet sender 210. Home agent 104 includes a packet receiver 212, a flow determiner 214, a performance treatment table 216, and a performance treatment applier 218. It will be understood that the components described in foreign agent 102 or home agent 104 may be found in either entity.

Data receiver 202 receives data for mobile node 108. For example, an application may be sending packets to mobile node 108 through home agent 104.

Flow determiner 204 may determine a flow that the data is associated with. For example, the data may be for a service, such as a VoIP application. Flow determiner 204 may use label table 206 to determine a label to attach to one or more packets used to send data. For example, different flows may be associated with different labels as shown in table 206. If the data is for a voice call session, then a label #1 may be determined; if the data is for a streaming video session, then a label #2 may be determined, etc.

Label attacher 208 may then generate a packet that includes the data and the determined label. For example, as described in the MPLS protocol, a packet is generated that includes the label in the MPLS header. If a packet is received from the application, it is encapsulated in an IP packet.

Packet sender 210 then sends the packet to home agent 104. For example, the packet may be sent through MPLS network 106, which routes the packet according to the label through a label switched path for the flow.

Packet receiver 212 receives the packet that is routed through MPLS network 106 using the label switched path. Home agent 104 may de-capsulate the packet to determine the data in it.

Flow determiner 214 may then determine a flow that is associated with the packet. For example, a performance treatment table 216 may include different labels that are associated with different performance treatments. For example, a label #1 is associated with a QoS #1; a label #2 may be associated with a QoS #2, etc. In one example, differentiated services (DiffServ) may be used to apply the performance treatment. For example, label #1 may be associated with an assured forwarding (aF) QoS level; label #2 may be associated with an expedited forwarding (eF) QoS level, etc. Once the flow for the label and the performance treatment associated with the flow are determined, performance treatment applier 208 may apply the determined performance treatment. For example, the data may be forwarded to its destination using the quality of service associated with the label. Thus, a mapping from a label switched path to a transport path is provided using the labels.

If data flows from foreign agent 102 to home agent 104, packets for a flow may be tagged with the same label as shown in label table 206 by foreign agent 102. These packets are then sent from foreign agent 102 to home agent 104. Home agent 104 then de-capsulates each of the packets and determines the label associated with each packet. The flow for the label is determined and it can then be forwarded through transport paths. For example, foreign agent 102 may then send the data to RAN 110 for forwarding to mobile node 108. The data is forwarded through the appropriate layer 2 connections based on the performance treatment determined.

A policy manager may configure the labels and performance treatments in label table 206 and performance treatment table 216. For example, the policy manager may send a policy request for an IP flow that requires a particular performance treatment, which is configured in home agent 104 and foreign agent 102. The policy request may be used to map flows to labels in label table 206 and also to map flows to performance treatments in performance treatment table 216. The mapping of flows to labels may be static or dynamic. For example, the mapping may be static and may be pre-configured. Thus, when labels are used for flows, they are always associated with the same performance treatment. Also, the labels may be dynamic in that signaling may be used to configure the performance treatment associated with a label.

Figure 3:
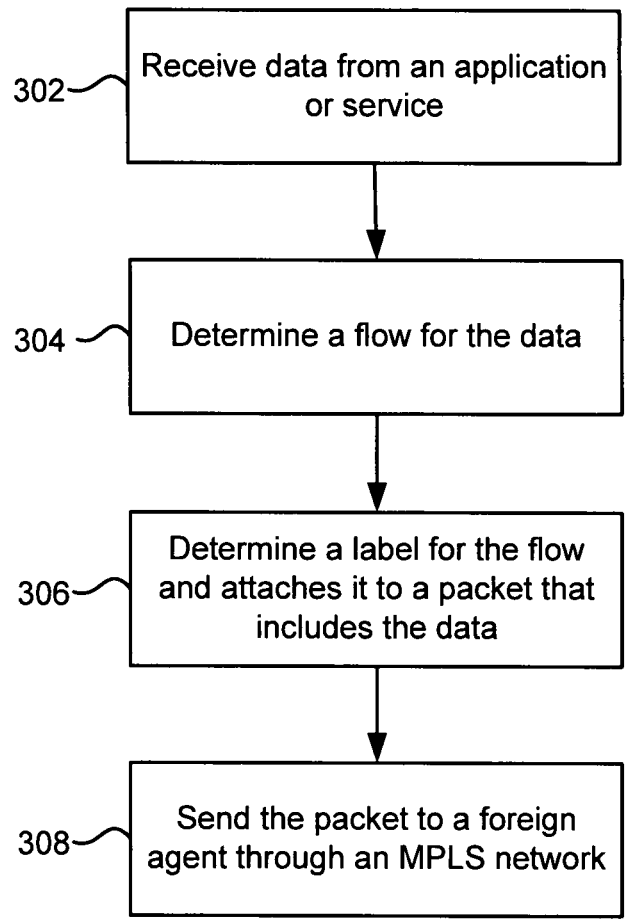
FIG. 3 depicts a method for sending data using labels.

FIG. 3 depicts a method for sending data using labels. Step 302 receives data from an application or service.

Step 304 determines a flow for the data. For example, mobile node 108 may have different sessions and the specific flow for a session is determined.

Step 306 determines a label for the flow and attaches it to a packet that includes the data. For example, the data may be encapsulated in a packet and the label may be included in an MPLS header.

Step 308 then sends the packet to foreign agent 102 through MPLS network 106. The MPLS network 106 routes the packet through the network using the label that has been attached in the MPLS header.

Figure 4:
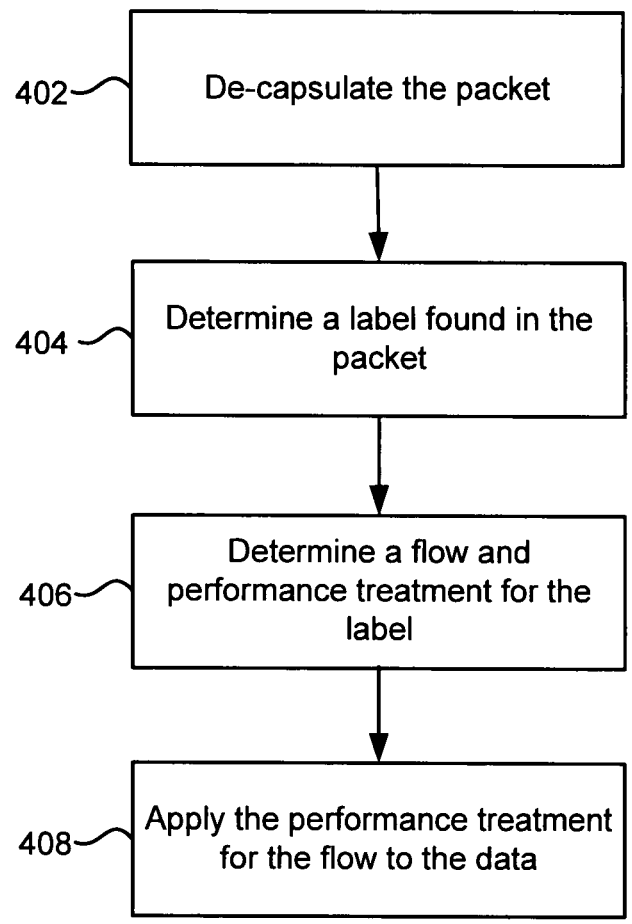
FIG. 4 depicts an example of a method for processing a received packet and applying a performance treatment.

FIG. 4 depicts an example of a method for processing a received packet and applying a performance treatment. Step 402 de-capsulates the packet. For example, a packet may have been encapsulated in an IP packet, which is de-capsulated.

Step 404 also determines a label found in the packet. For example, a label may be determined from an MPLS header.

Step 406 determines a flow and performance treatment for the label. For example, each flow may be associated with a performance treatment.

Step 408 then applies the performance treatment for the flow to the data. For example, the data may be transported according to a QoS through a layer 2 connection.

The MPLS-based solution scales very well and can support a large number of mobile nodes 108 because each label switched path can be shared by many mobile nodes. MPLS allows a simple and fast hand-off when a mobile node 108 moves between foreign agents 102. This is because the label switched path may be used by various foreign agents 102 by using the same labels to route packets.

Integrating MPLS with mobile IP also improves the scalability of mobile IP data forwarding processes by leveraging features in MPLS, such as traffic engineering, QoS, fast switching, small state maintenance and high scalability. Using MPLS in mobile IP does not require any changes to the IP stack and layer 3 mobility framework.

Further, MPLS may provide advantages when real-time services such as VoIP and video streaming are being provided. For example, MPLS may be used to provide fast mobility. For example, when a hand-off occurs, hand-off delay and packet loss may be reduced using MPLS. Use of MPLS offers lower latency since core/edge MPLS router performance is optimized. Also, the use of MPLS tunnels across the network can be provisioned to allow correct dimensioning for voice etc. This in turn reduces overall delay for handovers. Also, MPLS offers potential advantages over other protocols, such as generic routing encapsulation (GRE), because IP tunneling is not necessary when IP packets are sent between foreign agent 102 and home agent 104. Also, because the label header (e.g. 20 bytes) is much smaller than an IP+GRE header, the traffic overhead between foreign agent 102 and home agent 104 is reduced. Also, the forwarding process is performed at the MPLS layer and home agent 104 does not need to go up to the IP layer to do mobile IP.

Although the description has been described with respect to particular embodiments thereof, these particular embodiments are merely illustrative, and not restrictive. Although an MPLS network 106 is described, it will be understood that other IP networks may also be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that what is described in particular embodiments.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
    receiving, at a first node, first data and second data, wherein the first data and the second data are associated with a mobile node, wherein the mobile node includes a plurality of sessions for sending data through a layer 2 connection to the first node;
    determining a flow for each session in the plurality of sessions received at the first node using a flow determiner;
    assigning a label to each session in the plurality of sessions, wherein the assigned label is based on the type of flow for each session;
    determining a first data session in the plurality of sessions for the first data and a second data session in the plurality of sessions for the second data, wherein the first data session is different than the second data session;
    determining a first label for the first data session and a second label for the second data session, wherein the first label is different than the second label;
    sending a first packet including the first data and the first label to a second node, wherein the first packet is routed from the first node to the second node using the first label, wherein the second node uses the first label to determine a first performance treatment to apply to the first data; and
    sending a second packet including the second data and the second label to the second node, wherein the second packet is routed from the first node to the second node using the second label, wherein the second node uses the second label to determine a second performance treatment to apply to the second data, wherein the first performance treatment and the second performance treatment are different.

2. The method of claim 1, wherein data associated with a mobile node is mapped to appropriate label switched paths based on a quality of service associated with the label.

3. The method of claim 1, wherein the second data is sent in the second packet including a same source and destination as the packet used to send the first data.

4. The method of claim 1, wherein assigning the labels comprises:
    assigning the labels from a label table;
    determining a type of service associated with the first data and the second data; and
    determining the labels based on the type of service.

5. The method of claim 4, wherein a respective label switched path of a plurality of label switched paths is used to send data from the first node to the second node and the label switched path is shared by a plurality of mobile nodes, wherein data for a same type of service received from the plurality of mobile nodes is sent in the label switched path shared by the plurality of mobile nodes.

6. The method of claim 1, wherein the second node applies the first or second performance treatment and sends the first or second data to a destination different from the first node and the mobile node.

7. A method comprising:
    receiving, at a first node from a second node, a packet including data associated with a mobile node through a label switched path, wherein the mobile node includes a plurality of sessions for sending data through a layer 2 connection to the second node;
    determining a flow for each session in the plurality of sessions received at the first node using a flow determiner;
    assigning a label to a respective label switched path of a plurality of label switched paths that are used to send data from the first node to the second node, wherein each label is associated with a different quality of service level for each of the respective sessions that include a streaming video session, a voice over IP session, an e-mail session, and a web browsing session, wherein streaming video session is associated with an assured forwarding quality of service level and the web browsing session is associated with an expedited forwarding quality of service level;
    receiving, at the first node, a second packet including second data associated with the mobile node;
    determining a second label from the second packet, wherein labels in one or more labels correspond to one or more sessions;
    determining a second performance treatment for the second label; and
    applying the second performance treatment to the second data.

8. The method of claim 7, wherein the second data is sent in the second packet including a same source and destination as the packet used to send the data, wherein the second label is used to determine the second performance treatment to apply to the second data and the determined label is used to determine the performance treatment to apply to the data.

9. The method of claim 7, wherein the label switched path is shared by a plurality of mobile nodes, wherein data for a same type of service received from the plurality of mobile nodes is sent in the label switched path shared by the plurality of mobile nodes.

10. An apparatus comprising:
one or more computer processors; and
logic encoded in one or more tangible media for execution by the one or more computer processors and when executed operable to:
determine a flow for each session in a plurality of sessions received at a first node using a flow determiner;
assign a label to each session in the plurality of sessions, wherein the assigned label is based on the type of flow for each session, wherein each assigned label is associated with a different quality of service level for each of the respective sessions that include a streaming video session, a voice over IP session, an e-mail session, and a web browsing session, wherein streaming video session is associated with an assured forwarding quality of service level and the web browsing session is associated with an expedited forwarding quality of service level;
receive, at the apparatus, first data and second data, wherein the first data and the second data are associated with a mobile node that includes a plurality of sessions;
determine a first data session for the first data and a second data session for the second data in the plurality of sessions, wherein the first data session is different than the second data session;
determine a first label for the first data session and a second label for the second data session, wherein the first label is different than the second label;
send a first packet including the first data and the first label to a second node, wherein the first packet is routed from the first node to the second node using the first label, wherein the second node uses the first label to determine a first performance treatment to apply to the first data; and
send a second packet including the second data and the second label to the second node, wherein the second packet is routed from the first node to the second node using the second label, wherein the second node uses the second label to determine a second performance treatment to apply to the second data, wherein the first performance treatment and the second performance treatment are different.

11. The apparatus of claim 10, wherein the second data is sent in the second packet including a same source and destination as the packet used to send the first data.

12. An apparatus comprising:
one or more computer processors; and
logic encoded in one or more tangible media for execution by the one or more computer processors and when executed operable to:
determine a flow for each session in a plurality of sessions received at a first node using a flow determiner;
assign a label to a respective label switched path of a plurality of label switched paths that are used to send data from the first node to a second node, wherein each label is associated with a different quality of service level for each of the respective sessions that include a streaming video session, a voice over IP session, an e-mail session, and a web browsing session, wherein streaming video session is associated with an assured forwarding quality of service level and the web browsing session is associated with an expedited forwarding quality of service level;
receive, at the apparatus, a first data packet including first data and a second data packet including second data, wherein the first data and the second data are associated with a mobile node that includes multiple sessions;
determine a first label from the first data packet and a second label from the second data packet, wherein the first label is different than the second;
determine a first performance treatment for the first label;
determine a second performance treatment for the second label, wherein the first performance treatment is different than the second performance treatment; and
apply the first performance treatment to the first data and the second performance treatment to the second data.

13. The apparatus of claim 12, wherein the second data is sent in the second packet including a same source and destination as the packet used to send the first data.

* * * * *